United States Patent [19]

Dennis et al.

[11] 4,291,886
[45] Sep. 29, 1981

[54] AUTOMATIC RECORD CHANGER

[75] Inventors: James T. Dennis, P.O. Box 15100, Oklahoma City, Okla. 73115; George Kolomayets, Chicago, Ill.

[73] Assignee: James T. Dennis, Oklahoma City, Okla.

[21] Appl. No.: 9,254

[22] Filed: Feb. 5, 1979

Related U.S. Application Data

[63] Continuation of Ser. No. 813,225, Jul. 5, 1977, abandoned.

[51] Int. Cl.³ .............................................. G11B 17/08
[52] U.S. Cl. .................................... 369/203; 369/226; 369/231
[58] Field of Search .................................... 274/10 R

[56] References Cited

U.S. PATENT DOCUMENTS

| | | | |
|---|---|---|---|
| 2,614,847 | 10/1952 | Johnson | 274/10 R |
| 3,218,078 | 11/1965 | Freier | 274/10 R |
| 3,271,035 | 9/1966 | Johnston | 274/15 R |
| 3,305,239 | 2/1967 | Hathaway | 274/1 L |
| 3,339,928 | 9/1967 | Wolthausen | 274/1 L |
| 3,346,261 | 10/1967 | Kolomayets et al. | 274/10 R |
| 3,420,533 | 1/1969 | Kolomayets et al. | 274/10 R |
| 3,490,772 | 1/1970 | Dennis | 274/10 R |
| 3,801,109 | 4/1974 | Kolomayets et al. | 274/10 R |
| 4,049,278 | 9/1977 | Dennis | 274/10 R |

Primary Examiner—Steven L. Stephan
Attorney, Agent, or Firm—Mason, Kolehmainen, Rathburn & Wyss

[57] ABSTRACT

An extremely simple record changer mechanism is provided wherein only two members interconnect the tone arm subassembly with the main cycling gear in the spindle area of the changer. One of these members is employed to lift and lower the tone arm and the other member is used for the dual purpose of moving the tone arm horizontally during the record changing cycle and also acts as a velocity trip actuating member during the playing cycle. Both members are designed to avoid damage to the mechanism if the tone arm is moved or restrained during the record changing cycle.

87 Claims, 64 Drawing Figures

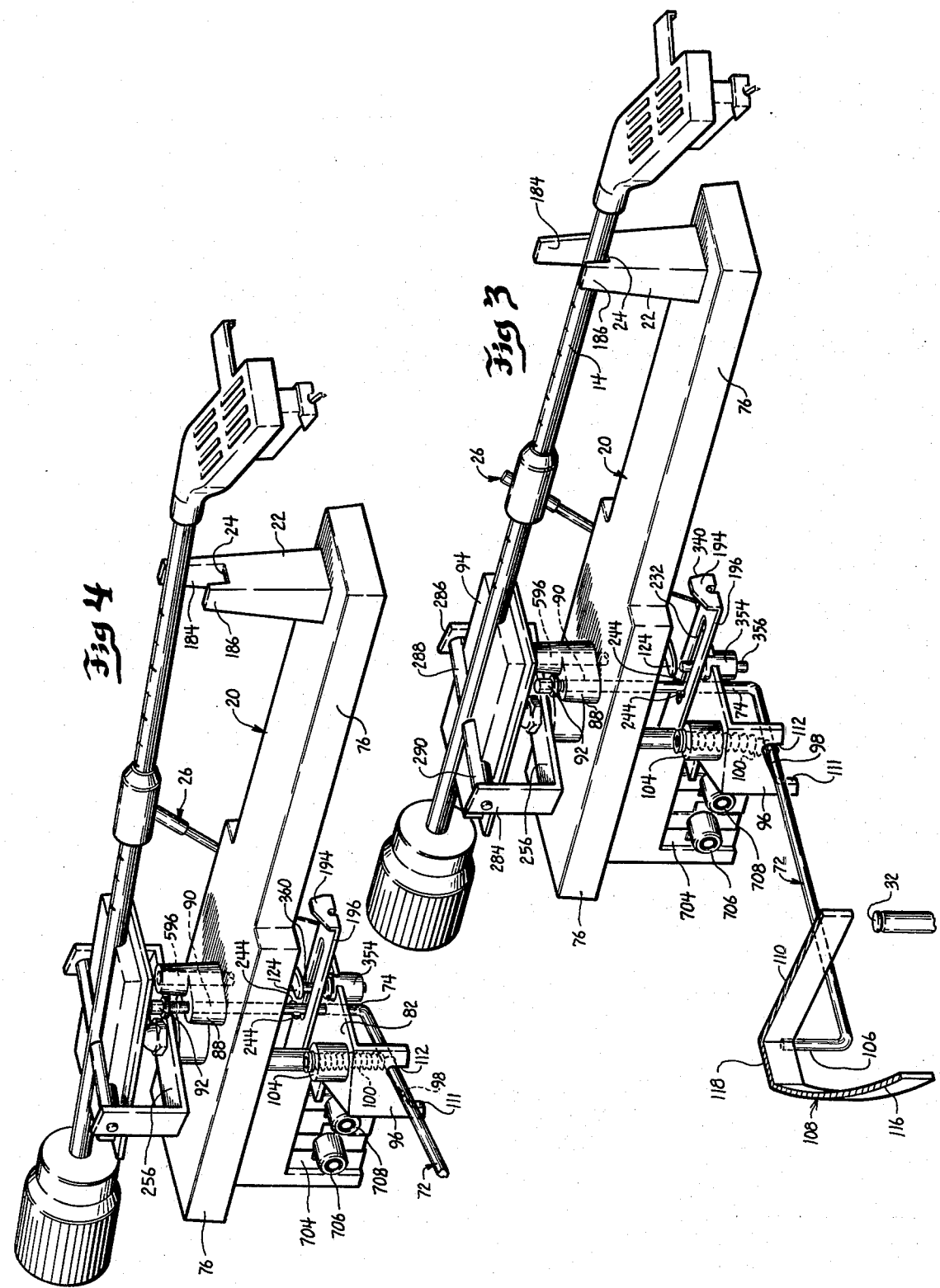

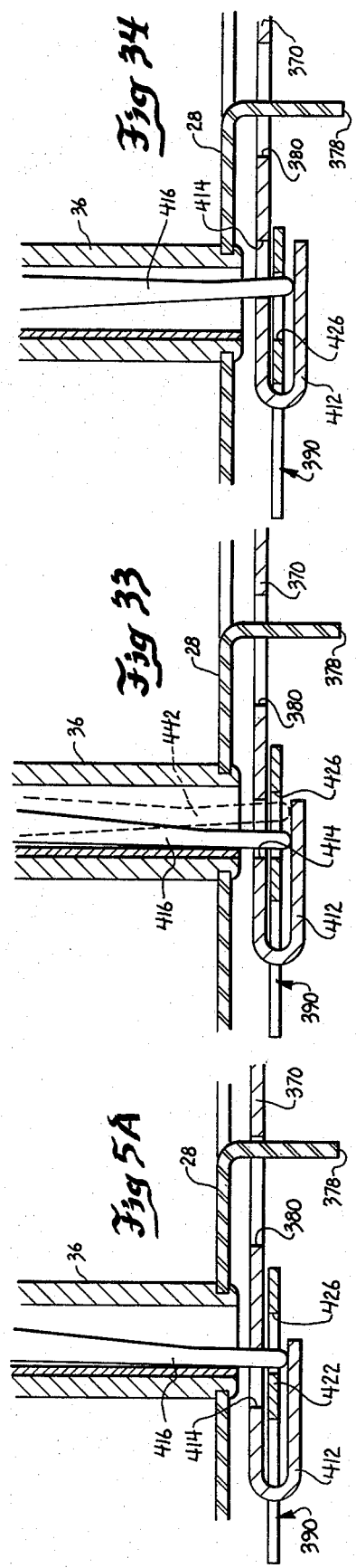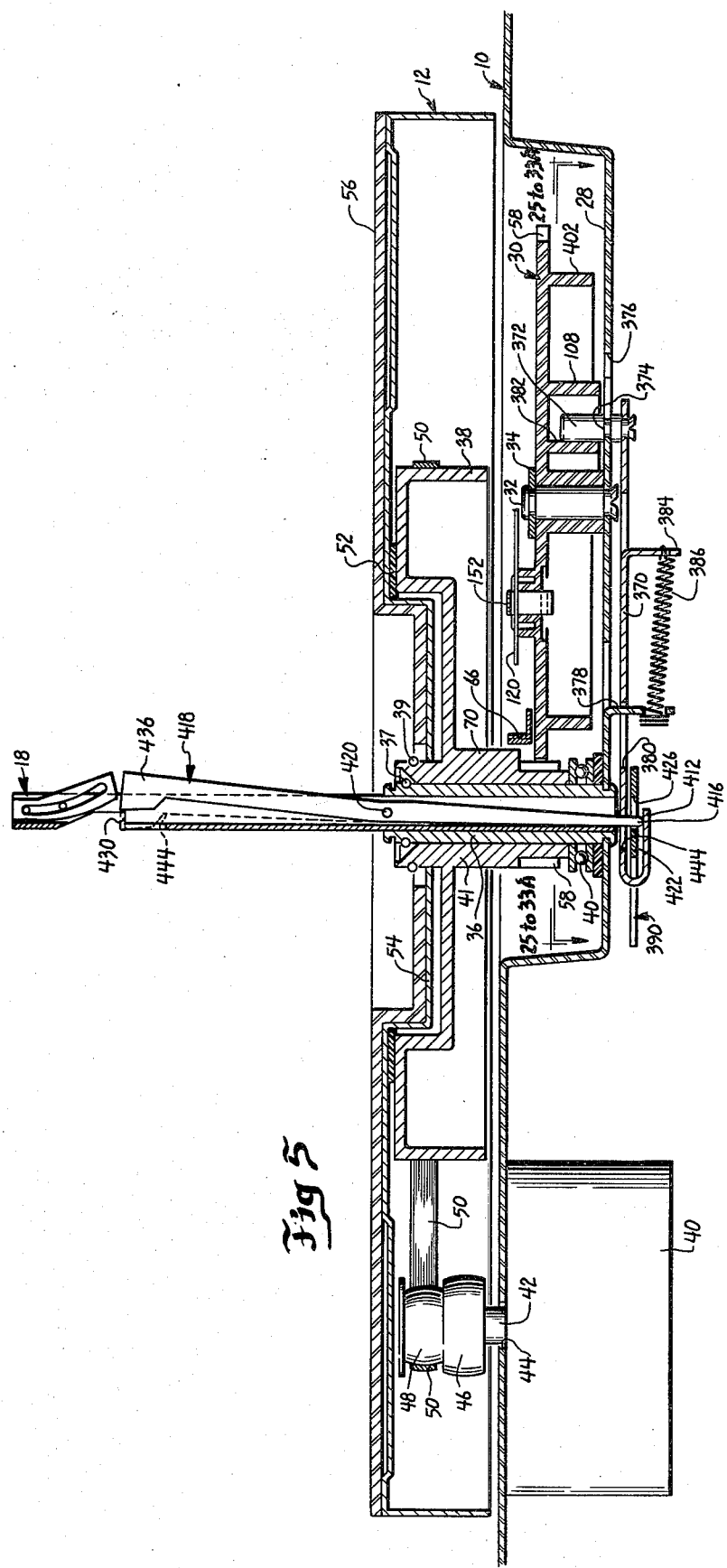

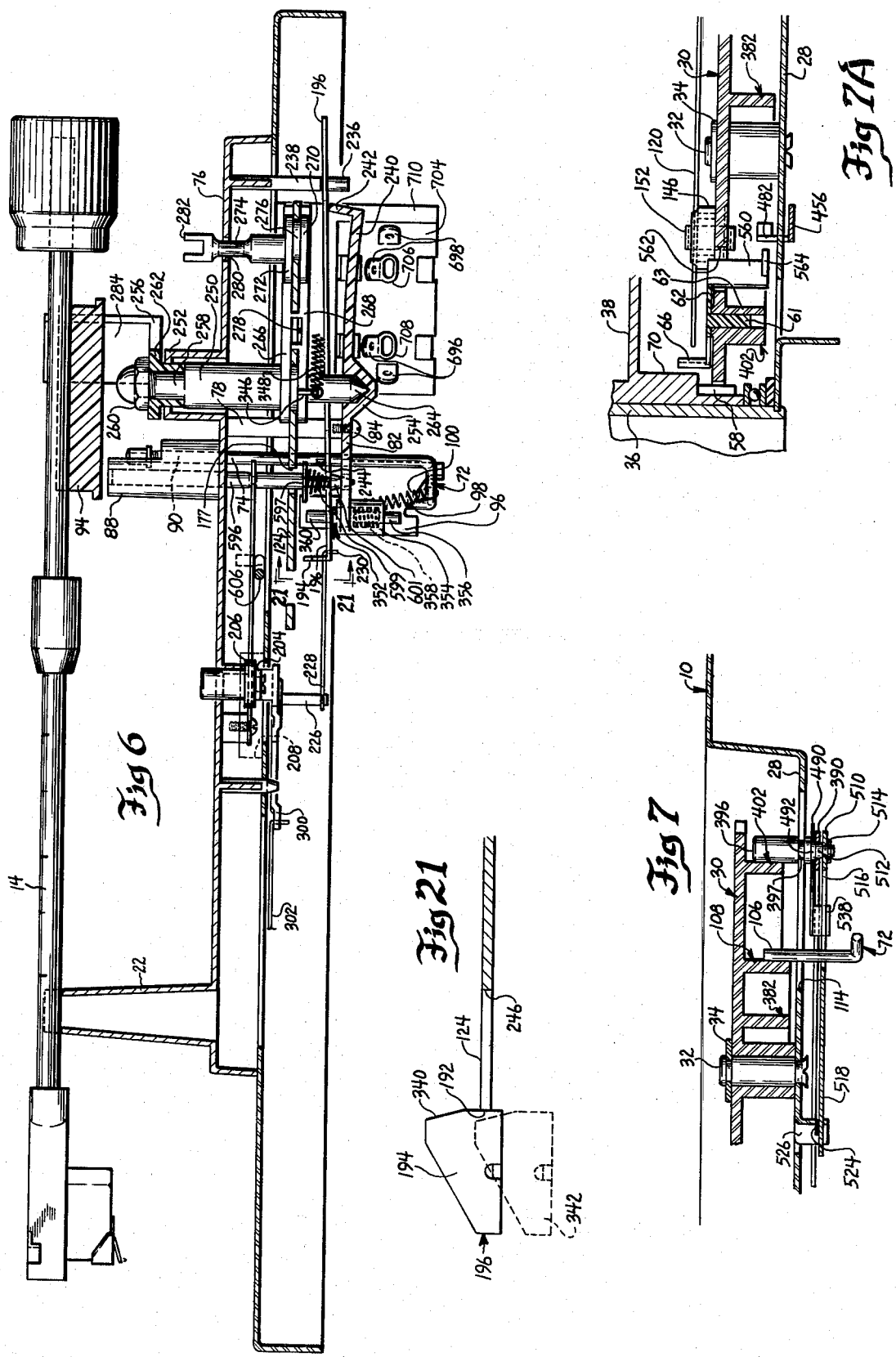

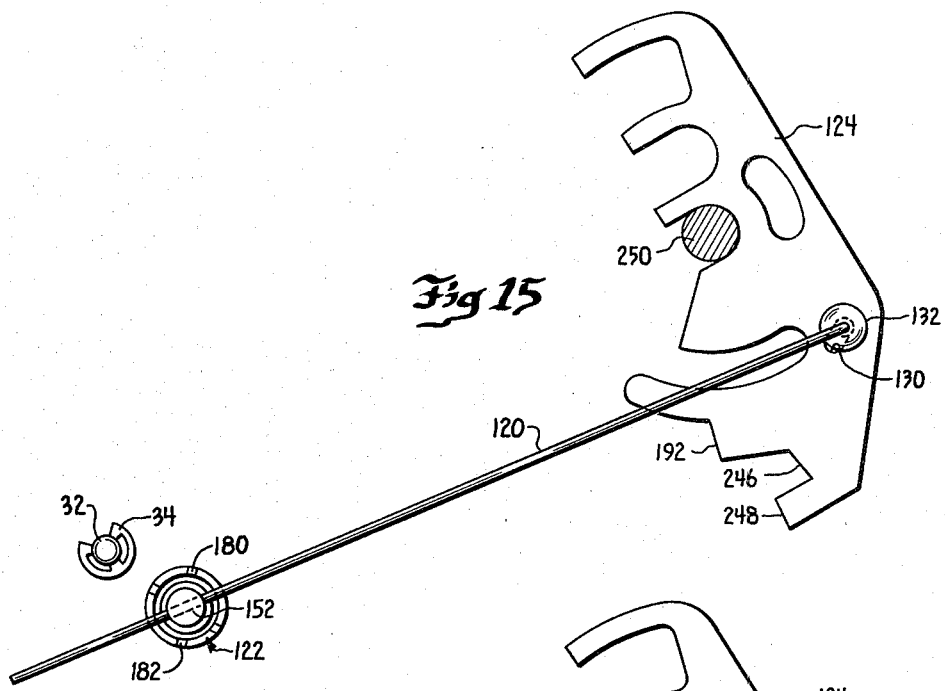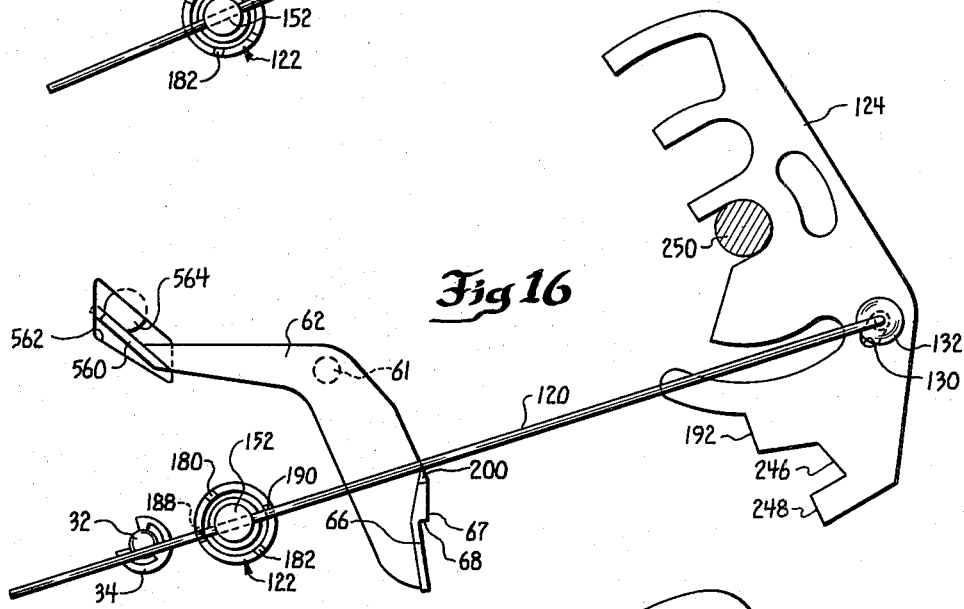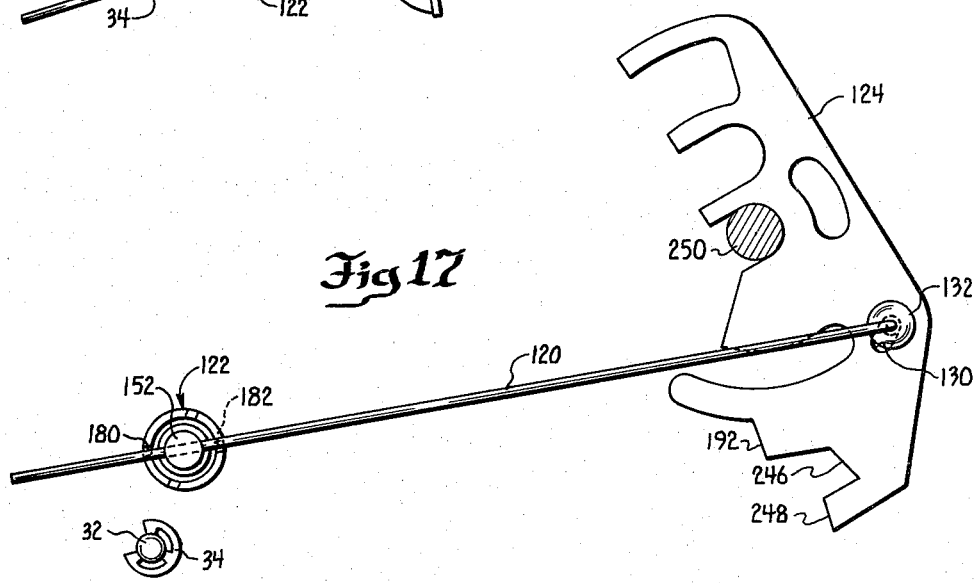

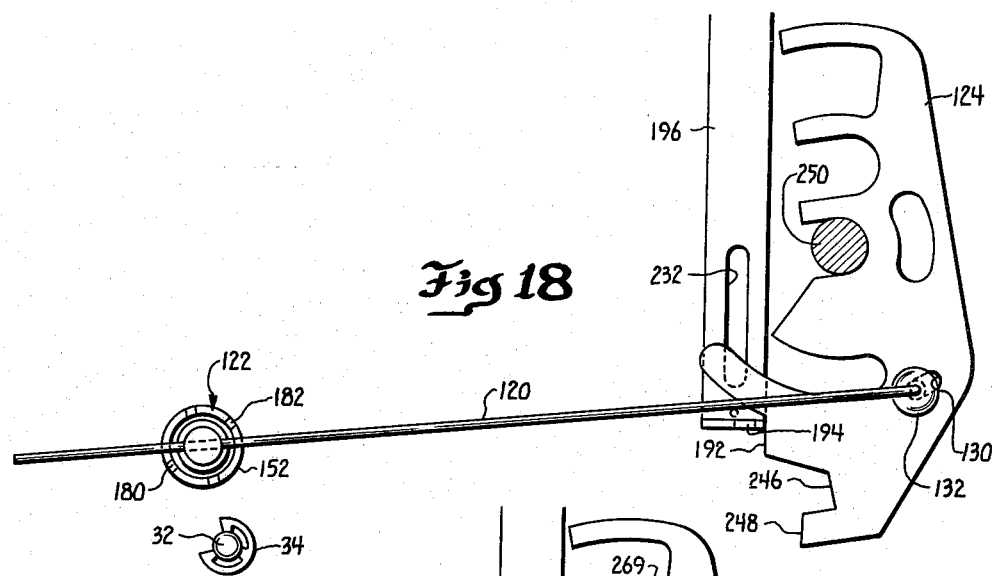
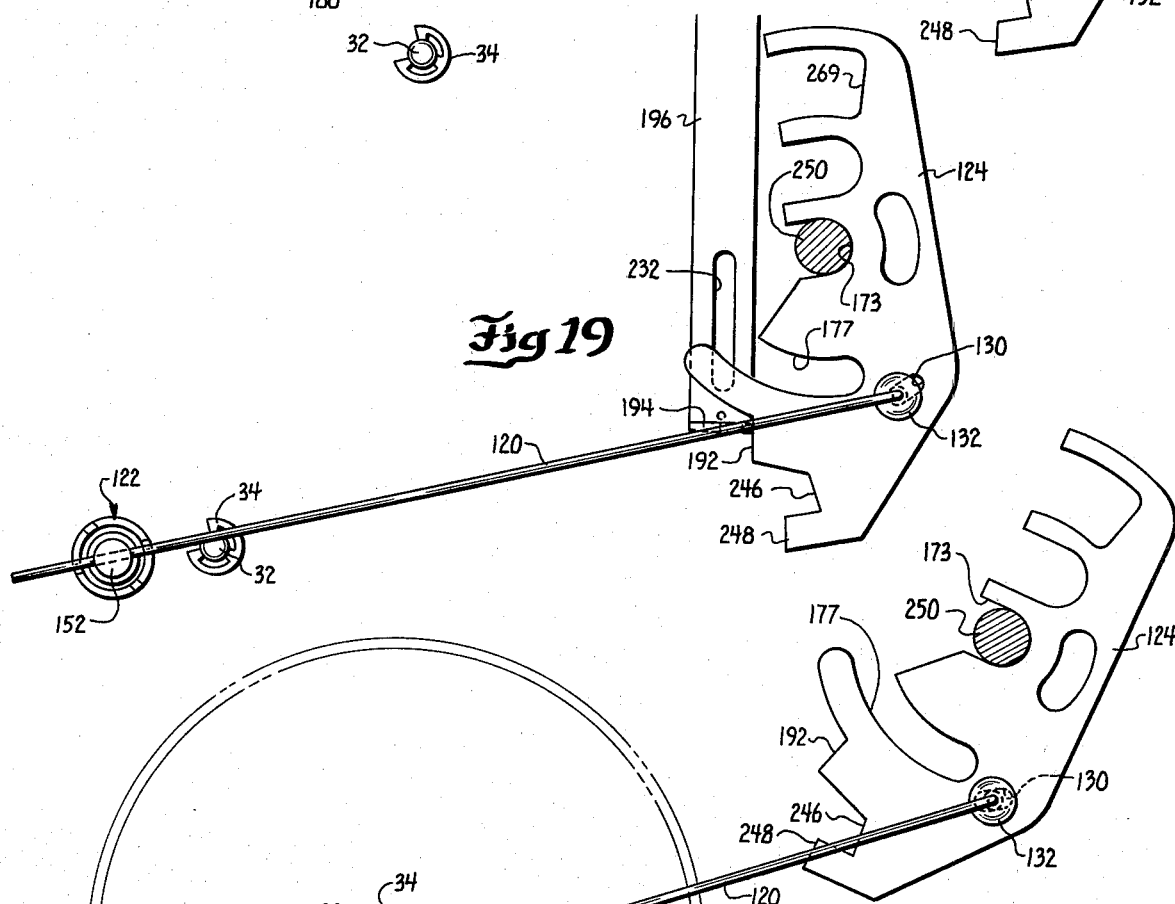
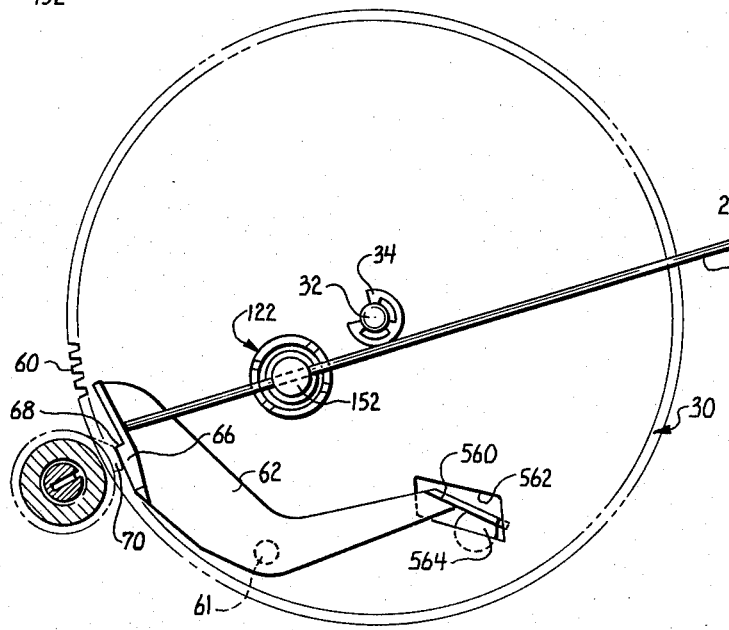

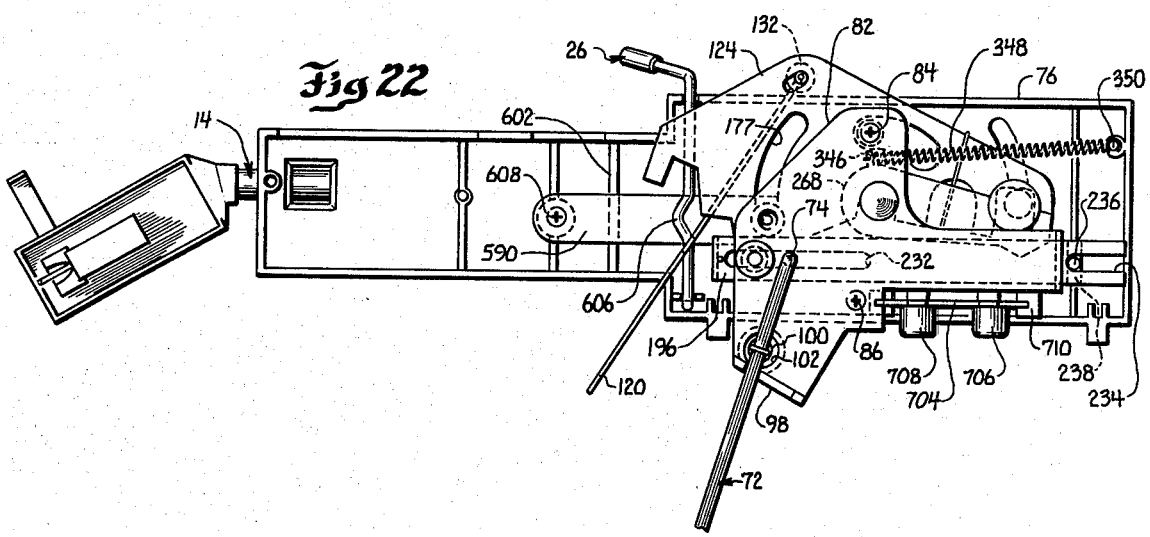

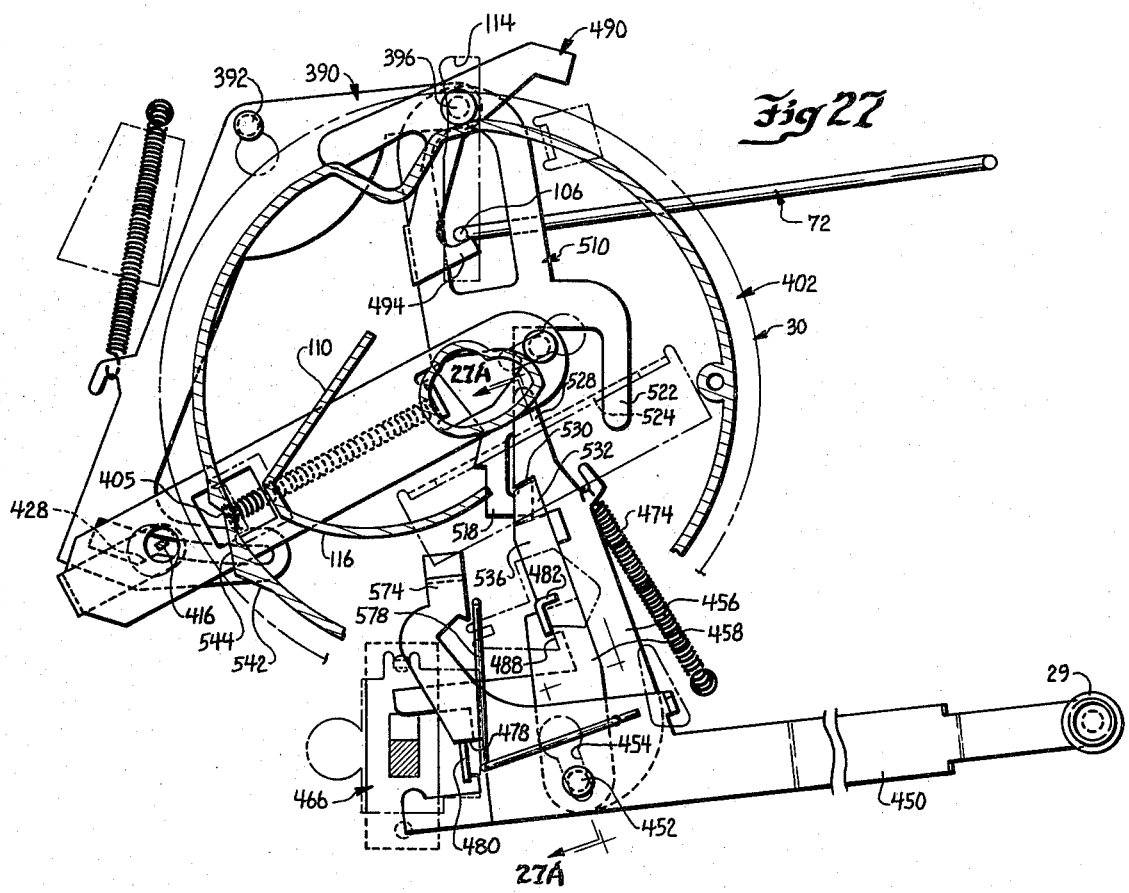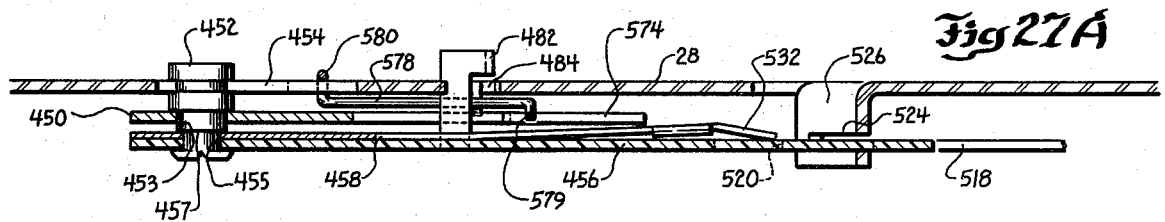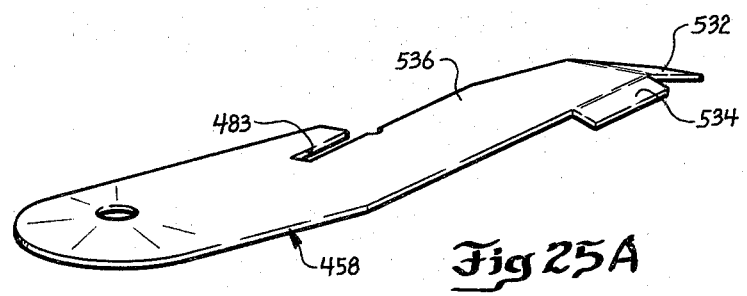

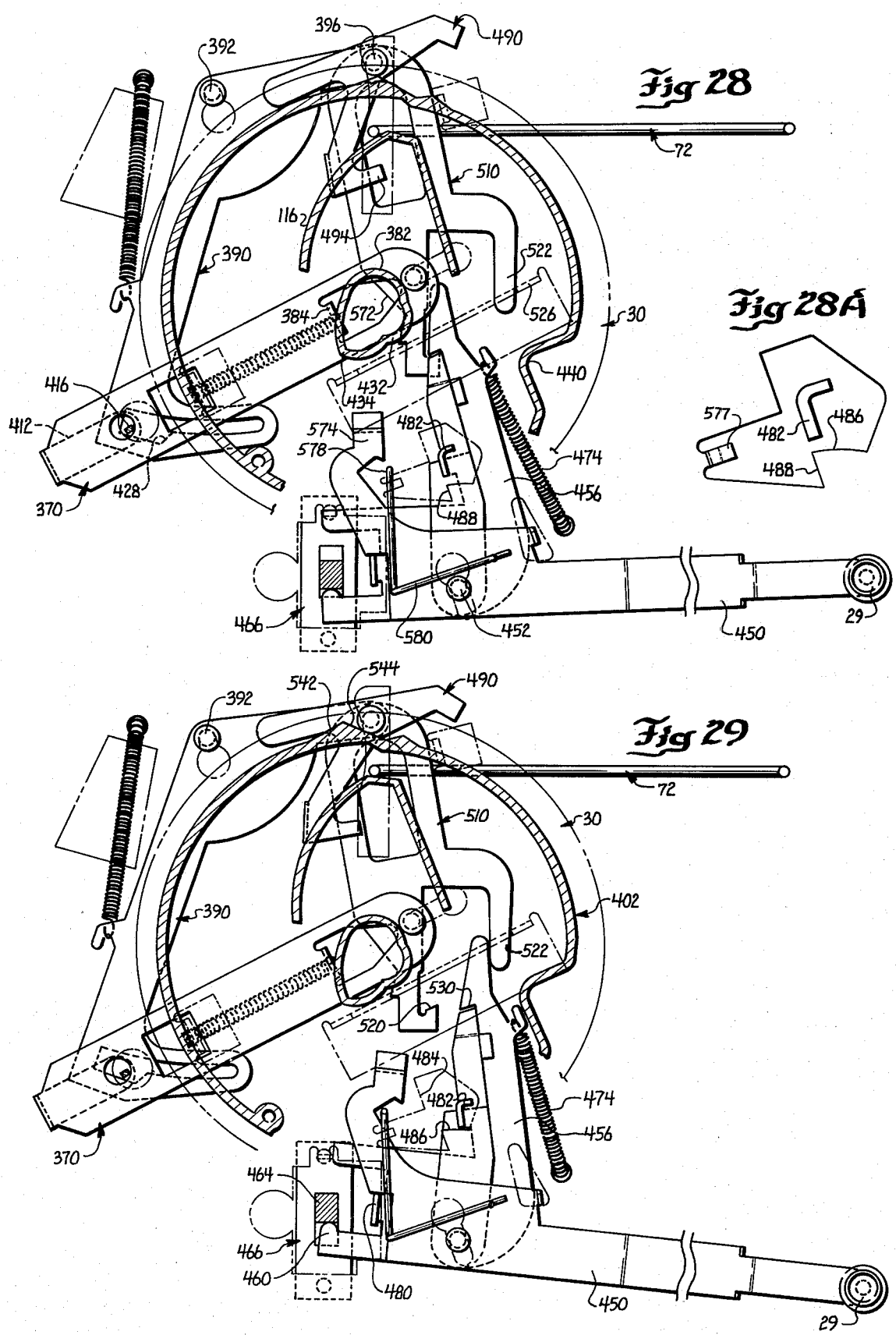

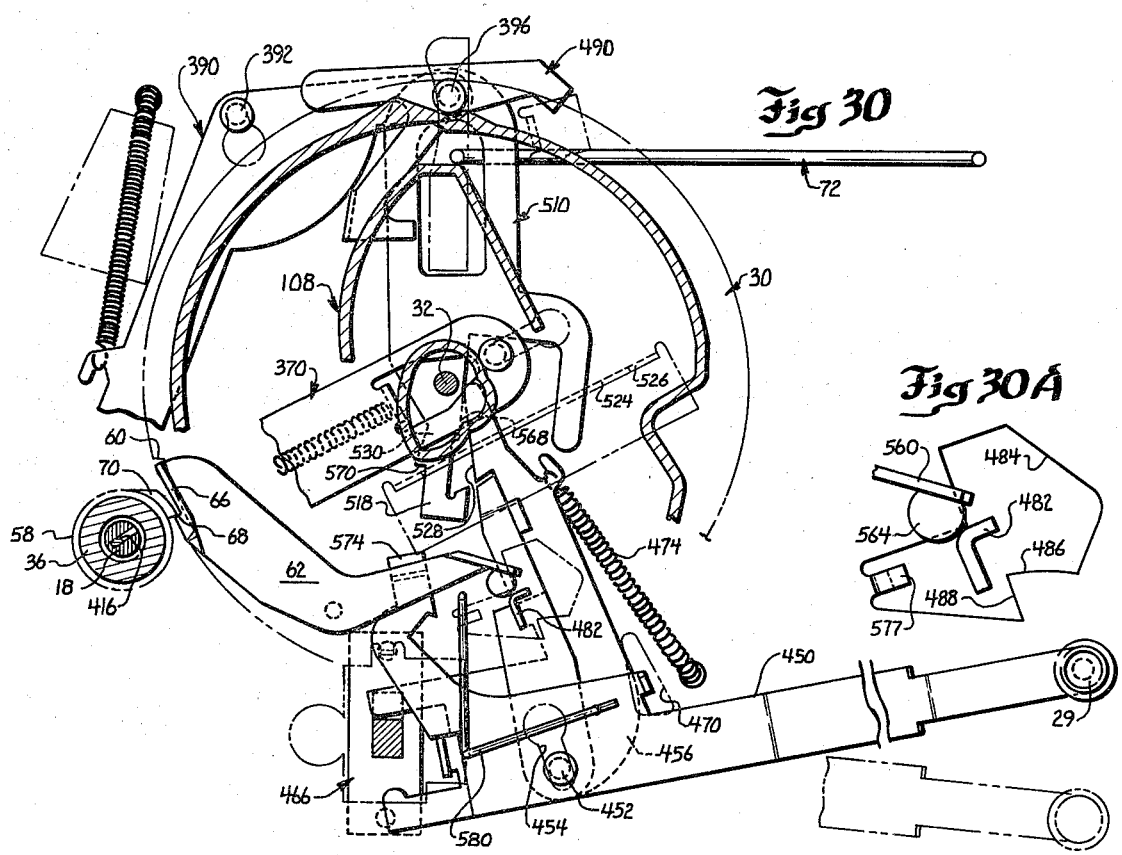
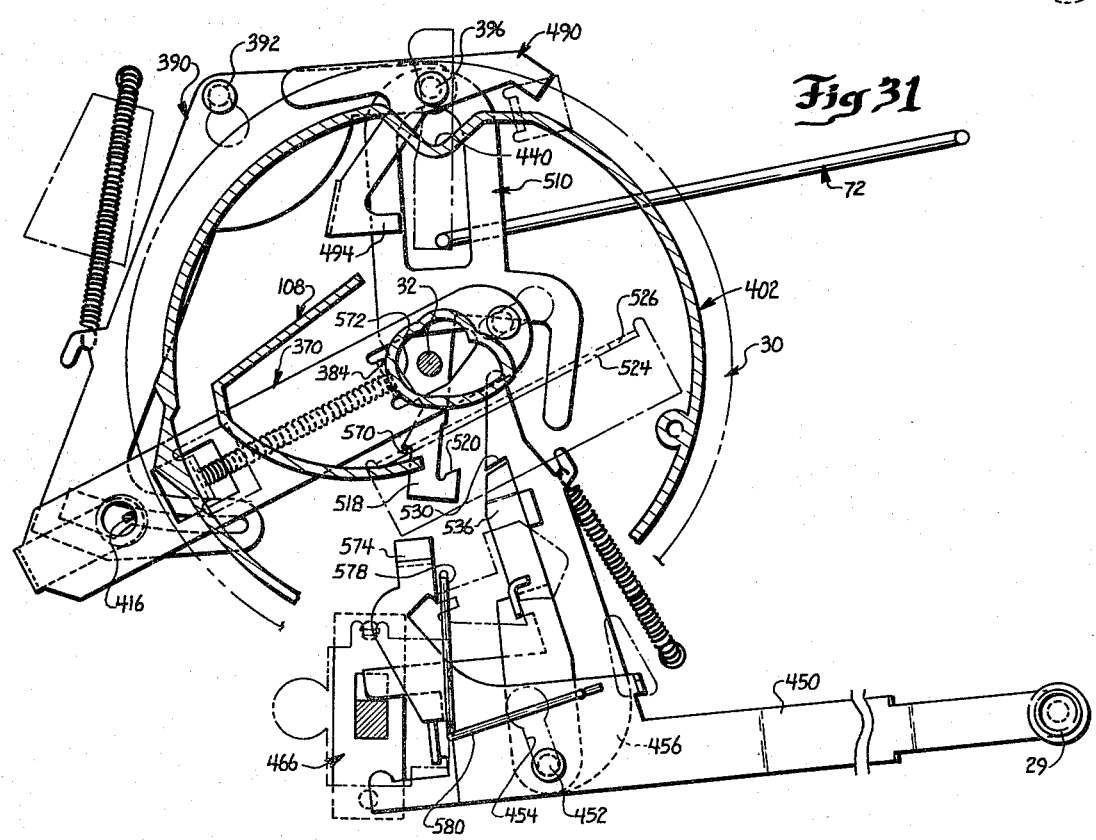

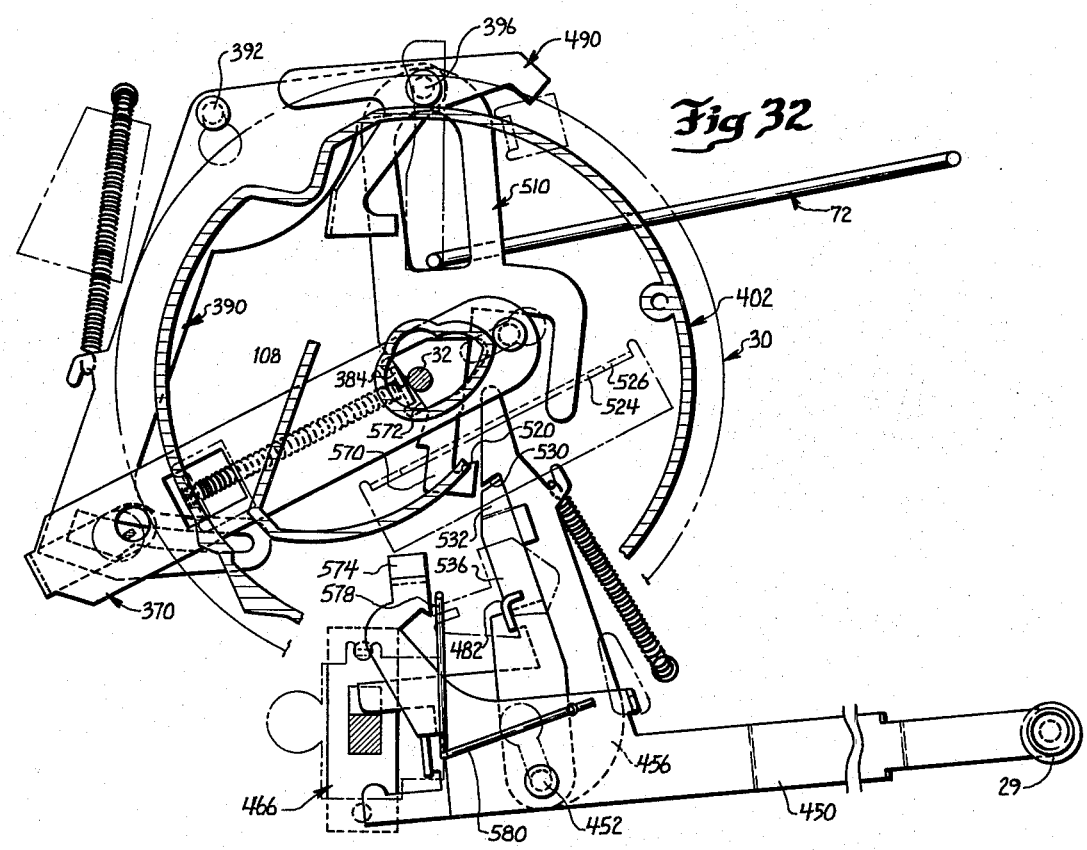

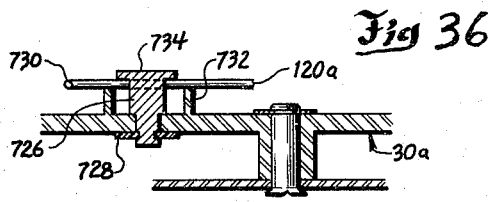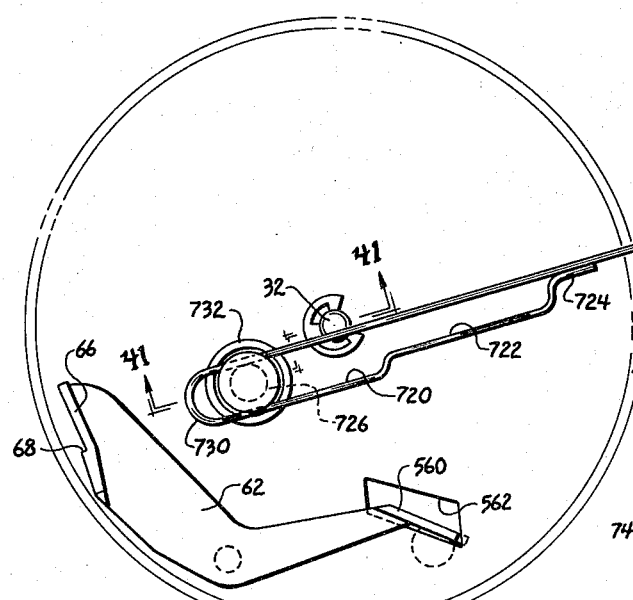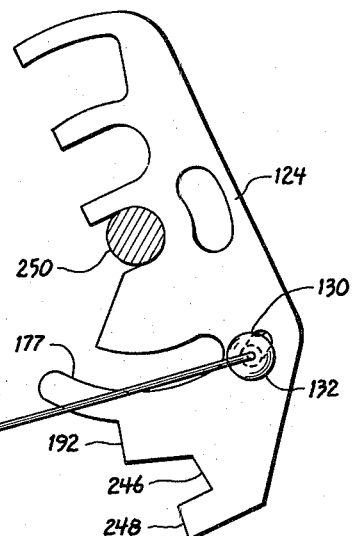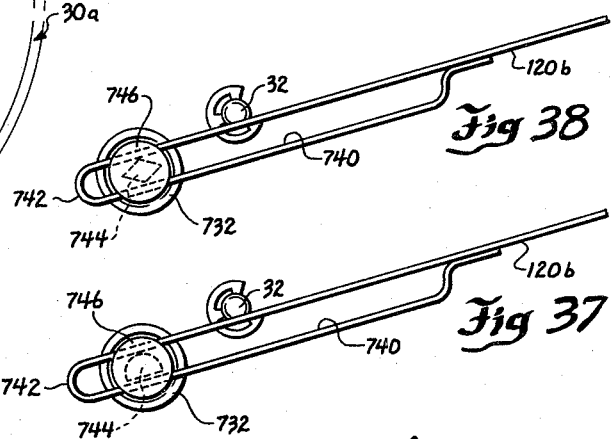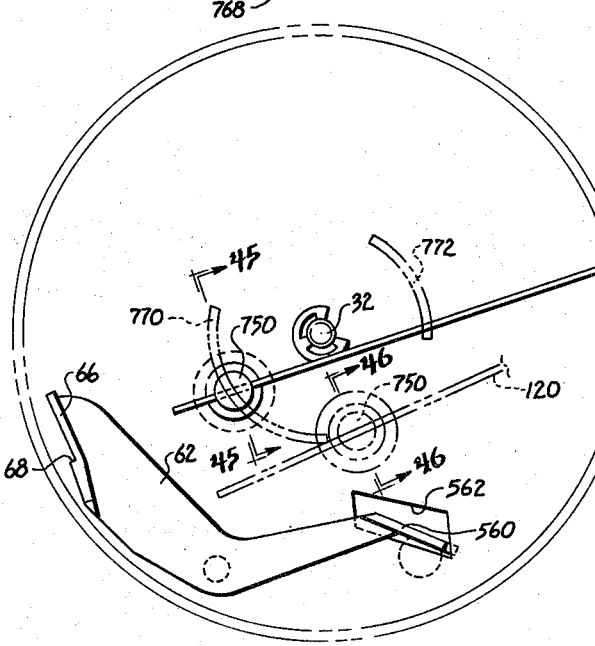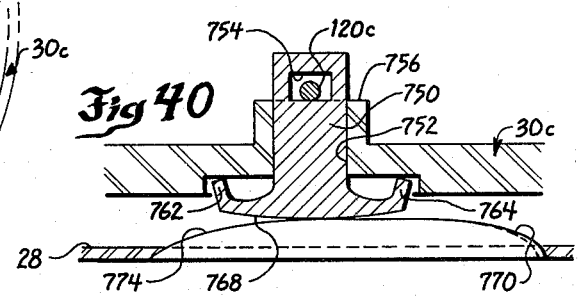

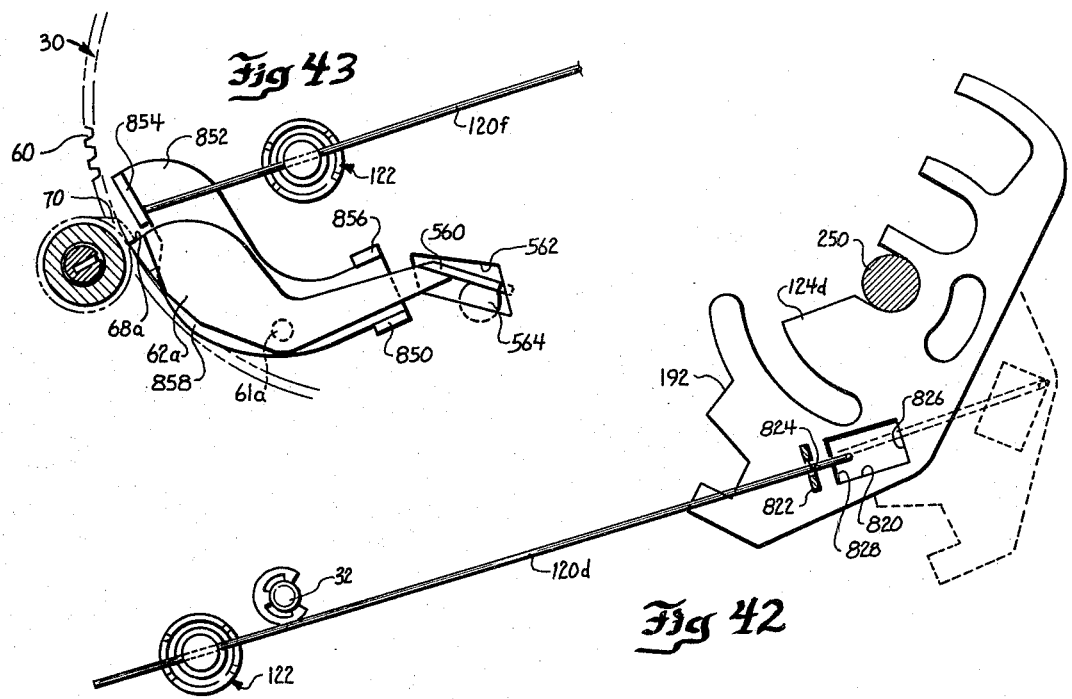

AUTOMATIC RECORD CHANGER

This is a continuation of application Ser. No. 813,225 filed July 5, 1977, now abandoned.

The present invention relates to record changers, and more particularly, to automatic record changers which are arranged to play a series of phonograph records in the order in which the records are placed on the centering spindle of the record changer.

Present day automatic record changers are much too complicated and expensive to manufacture. For example, the changer manufactured by BSR Ltd., which changer constitutes approximately eighty percent of the total world's production of automatic record changers, has approximately 220 parts and requires a substantial amount of labor to assemble and test these parts in order to manufacture the complete record changer. In addition, most, if not all, present day automatic record changers are sensitive to warpage and bending of the metal base plate on which the parts of the record changer are assembled. This base plate is conventionally made of relatively thin sheet metal and the tone arm driving and positioning mechanisms become misaligned and malfunction when warpage or bending of the base plate occurs, either in production, during shipping, or after the changer has been used by the customer. Furthermore, because the functions at the center of the turntable are interconnected with the functions at the tone arm mechanism by means of complicated linkages, and the like, it is not possible to separately test and align the tone arm assembly before it is assembled in the main base plate. Accordingly, the manufacturing cost of such arrangements is substantially increased. Also, in order to properly position the tone arm over the rest post of the changer, most conventional changers require indexing means associated with the tone arm quadrant for stopping the tone arm over the rest post and lowering it onto the rest post during the last record shutoff cycle. However, such arrangements are also sensitive to warpage and bending of the base plate which tends to misalign the portion of the base plate containing the rest post with respect to the area at which the tone arm is rotatably mounted.

With regard to the velocity tripping arrangements employed in many conventional changers, these velocity tripping arrangements usually employ two or more parts which are frictionally interconnected and can become randomly oriented by shock or vibration as the main gear is dented. In order to prevent this action it is customary to employ a relatively heavy friction force between the plates to prevent such misalignment. However, when such heavy friction is employed it is difficult to trip the changer with lightweight tone arm pressure in the order of one gram.

In Dennis U.S. Pat. No. 3,254,896 an arrangement is disclosed for stopping the turntable during the record changing cycles so that records are deposited on a stationary turntable. While this arrangement is generally suitable for its intended purpose, it is necessary with the arrangement disclosed therein to move the idler drive wheel out of engagement with the turntable rim before the turntable is stopped. In Dennis U.S. Pat. No. 3,408,081 a two turntable arrangement is employed wherein both turntables are lowered during the record changing cycle until the upper turntable engages stationary snubbing blocks and hence becomes disconnected from the lower driving turntable. While these arrangements for stopping the turntable are generally satisfactory for their intended purpose, it would be desirable to provide a somewhat simpler arrangement for stopping the turntable which could be readily incorporated into a particular automatic record changer if such a turntable pause feature is used.

It is, therefore, a primary object of the present invention to provide a new and improved automatic record changer wherein one or more of the above discussed disadvantages of prior art arrangements is avoided.

It is a further object of the present invention to provide a new and improved automatic record changer which requires approximately one half as many parts as conventional record changers and can be manufactured on a mass production basis at low cost and with a minimum amount of labor.

It is another object of the present invention to provide a new and improved automatic record changer which is relatively insensitive to warpage and bending of the base plate of the changer.

It is a still further object of the present invention to provide a new and improved automatic record changer wherein positioning of the tone arm over the rest post during the last record shutoff cycle is relatively insensitive to warpage and bending of the base plate or misalignment of parts.

It is another object of the present invention to provide a new and improved automatic record changer wherein the tone arm is positioned during a last record shutoff cycle by physical engagement with a portion of the rest post, this engagement functioning accurately to register the tone arm for subsequently lowering into engagement with the rest post.

It is a still further object of the present invention to provide a new and improved automatic record changer wherein the tone arm is positioned over the rest post and lowered into retained engagement therewith somewhat before mid cycle of a last record shutoff cycle, the tone arm driving mechanism having a slip clutch arrangement to permit such retained engagement at mid cycle.

It is a further object of the present invention to provide a new and improved automatic record changer wherein the tone arm mechanism is mounted on a separate subassembly which is interconnected with the main cycling gear of the changer by means of only two members for lifting and driving the tone arm, the positioning of which is relatively insensitive to warpage and bending of the base plate.

It is a further object of the present invention to provide a new and improved tone arm subassembly for use in automatic record changers which may be manufactured as a separate item and aligned mechanically and electrically checked before it is assembled into the main base plate of the changer.

It is another object of the present invention to provide a new and improved tone arm driving arrangement for used in an automatic record changer which is extremely simple and reliable and provides smooth tone arm movements by means of a slip clutch drive arrangement to permit the tone arm to be restrained by any time and particularly at mid cycle during the last record shutoff cycle.

It is another object of the present invention to provide a new and improved tone arm driving arrangement for use in an automatic record changer which also functions as a light force velocity tripping mechanism during the playing cycle.

It is a further object of the present invention to provide a new and improved automatic record changer wherein a single element is employed to interconnect the tone arm with a main cycling gear for controlling horizontal movement of the tone arm, this element also functioning as a velocity trip actuating member during the playing cycle.

Briefly, in accordance with the present invention an extremely simple record changer mechanism is provided wherein only two members interconnect the tone arm subassembly with the main cycling gear in the spindle area of the changer. One of these members is employed to lift and lower the tone arm and the other member is used for the dual purpose of moving the tone arm horizontally during the record changing cycle and also acts as a velocity trip actuating member during the playing cycle. Both members are designed to avoid damage to the mechanism if the tone arm is accidentally moved or restrained during the record changing cycle. The presence or absence of a record on the spindle shelf is sensed by blade means which is moved in the direction of the shelf during the initial portion of the record changing cycle. If no record is present on the shelf, somewhat before mid cycle the tone arm is lowered into engagement with a retaining notch on the rest post and the turntable motor is turned off at the end of this last record shutoff cycle.

A turntable pause feature is provided by simply applying a braking force to the rim of the turntable while the turntable hub continues to be driven, a simple washer of low coefficient of friction material between the turntable and its hub permitting the turntable to be stopped while the driving motor continues to rotate the turntable hub.

The control knob normally used for ON-OFF-REJECT functions, is provided with a 4th position in which the record changer repeatedly plays a record on the turntable without shutting off the machine. This REPEAT PLAY position is reached by first moving the control knob to the ON or REJECT position and then moving it back OFF to a position between the ON and OFF positions. When so moved, a detent force is provided for the control knob and an audible click is produced to inform the operator that the REPEAT PLAY position has been reached.

The invention both as to its organization and method of operation, together with further objects and advantages thereof, will best be understood by reference to the following specification taken in connection with the accompanying drawings.

FIG. 3 is a perspective view of the tone arm subassembly of the changer of FIG. 1 when the changer is turned off;

FIG. 4 is a view similar to FIG. 3 but showing the position of the tone arm near the end of a last record shutoff cycle;

FIG. 5 is a fragmentary sectional view taken along the lines 5—5 of FIG. 1;

FIG. 5A is a fragmentary external view similar to FIG. 5 but taken on a larger scale;

FIG. 6 is a fragmentary sectional view taken along the lines 6—6 of FIG. 1;

FIG. 7 is a fragmentary sectional view taken along the line 7—7 of FIG. 2;

FIG. 7A is a sectional view taken along the line 7A—7A in FIG. 1;

FIGS. 14 to 19 are views similar to FIG. 13 but showing the main gear at different positions in the record changing cycle;

FIG. 20 is a view similar to FIG. 13 but showing the action of the velocity tripping mechanism of the changer of FIG. 1 during a playing cycle;

FIG. 21 is a fragmentary sectional view taken along the lines 21—21 of FIG. 6 and showing the tone arm quadrant in the twelve-inch record set down position;

FIG. 22 is a bottom view of the tone arm subassembly of FIG. 3;

FIG. 25A is a perspective view of the flat spring blocking member employed in the changer of FIG. 1.

FIGS. 27, 28 and 29 are views similar to FIG. 26 but showing the main cam in different positions during a last record shutoff cycle;

FIG. 27A is a fragmentary sectional view taken along the line 27A—27A of FIG. 27;

FIG. 28A is a fragmentary sectional view similar to FIG. 28 but taken on a somewhat larger scale;

FIG. 30 is a sectional view similar to FIG. 25 but showing the control knob in the REJECT position to initiate a record changing cycle;

FIG. 30A is a fragmentary sectional view similar to FIG. 30 but taken on a somewhat larger scale.

FIG. 31 is a view similar to FIG. 26 but showing the mechanism in a single automatic record play position;

FIG. 32 is a view similar to FIG. 31 but showing the main gear at a later point in the single record automatic play changing cycle;

FIGS. 33 and 34 are fragmentary sectional views similar to FIG. 5A but showing the parts in different positions of a last record sensing cycle;

FIG. 33A is a view similar to FIG. 25 but showing the mechanism in a repeat play position;

FIG. 35 is a fragmentary plan view of an alternative tone arm drive and velocity trip actuating mechanism which can be used in the changer of FIG. 1;

FIG. 36 is a sectional view taken along the line 41—41 of FIG. 35;

FIGS. 37 and 38 are fragmentary plan views of further alternative drive-trip arrangements similar to the embodiment of FIGS. 35 and 36;

FIG. 39 is a fragmentary plan view of an alternative tone arm drive and trip actuating mechanism which can be used in the changer of FIG. 1;

FIG. 40 is a sectional view along the line 45—45 of FIG. 39;

FIG. 41 is a sectional view along the line 46—46 of FIG. 39;

FIG. 42 is a fragmentary plan view of a further alternative embodiment of the invention wherein a modified drive link arrangement is employed to move the tone arm horizontally; and FIG. 43 is a plan view of an alternative embodiment of the invention wherein a two-plate velocity tripping arrangement is employed.

Figure 1:
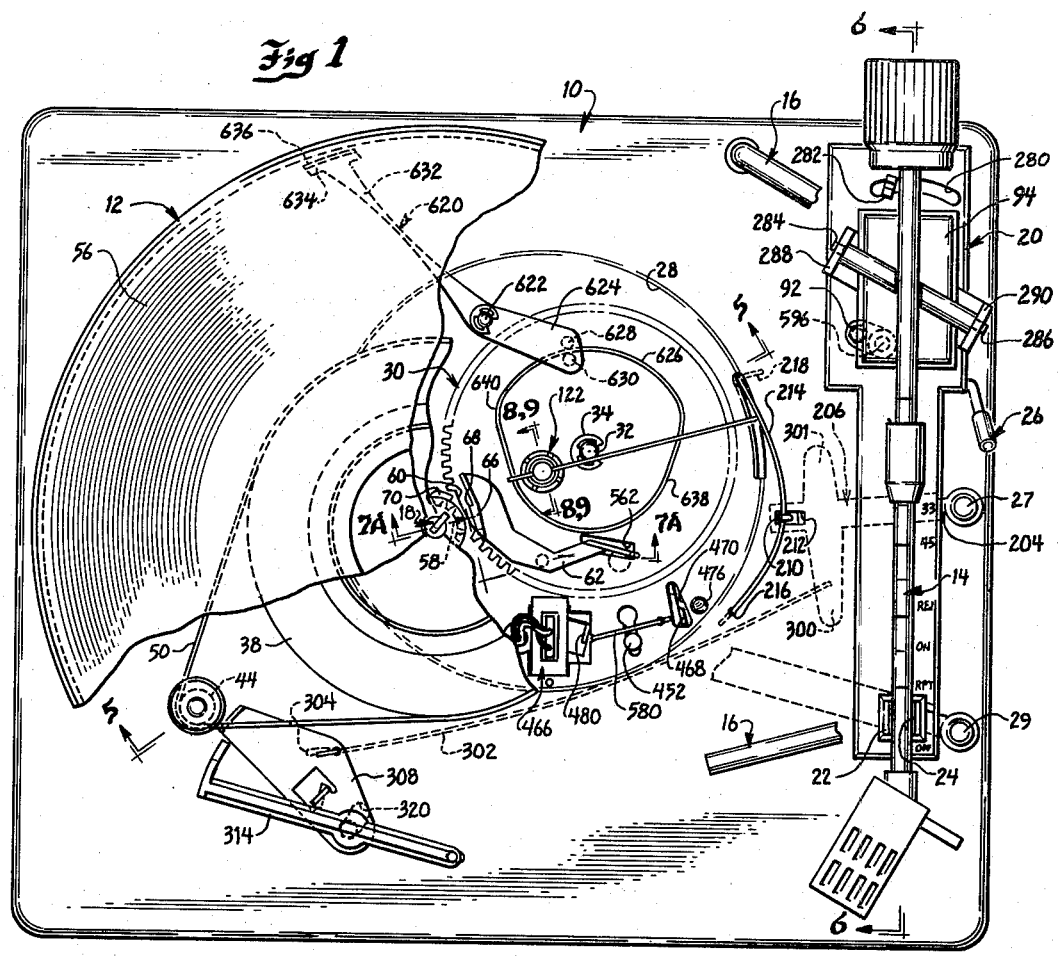
FIG. 1 is a top plan view of the record changer of the present invention with a portion of the turntable broken away to show a portion of the record changing mechanism.

Referring now to the drawings, and more particularly to FIGS. 1 through 34 thereof, the automatic record changer of the present invention is therein illustrated as comprising a metal base plate indicated generally at 10 on which is mounted a rotatable turntable indicated generally at 12, a tone arm indicated generally at 14, and a balance arm indicated generally at 16. The turntable 12 is mounted for rotation about a centering spindle indicated generally at 18 on which a stack of records may be supported and the balance arm 16 moved from its rest position somewhat beyond the position shown in FIG. 1 to a position over the records so that these records are balanced on the record supporting shelf of the spindle 18.

The tone arm 14 is rotatably mounted on a tone arm housing subassembly indicated generally at 20, the housing 20 being provided with a rest post portion 22 which extends upwardly from the housing 20 and is provided with a relatively deep notch 24 in the top thereof within which the tone arm 14 may be seated when the record changer is turned off. A cueing lever indicated generally at 26 is rotatably mounted in the tone arm subassembly 20 and may be moved from a generally verticaly position shown in FIGS. 1 and 24 to a rearward inclined position shown in FIG. 23. When the cueing lever 26 is in the vertical position shown in FIG. 1, it is ineffective to lift the tone arm. However, when the cueing lever is moved to the rearward position it is effective to lift the tone arm off of the record after which it may be manually placed over another selection on the record or moved over the rest position 24. Then, the cueing lever may be used manually to lower the tone arm 14 into engagement with a record on the turntable 12, or the notch in the rest post, as will be readily understood by those skilled in the art.

A combined speed and size control knob 27 is provided which in the illustrated embodiment is movable between a 33⅓ rpm position and a 45 rpm position. In the 33⅓ rpm position the tone arm 14 is automatically adjusted to play 12-inch records and in the 45 rpm position the tone arm is automatically adjusted to play 7-inch records. When small-hole seven-inch records are to be played they may be placed on the shelf of the spindle 18 and the balance arm 16 employed to balance the record stack. When large-hole seven-inch records are employed a suitable adaptor may be placed on the spindle 18, as will be readily understood by those skilled in the art. In the event 10-inch 78 rpm records are to be played, the knobs 27 may be provided with a third detent position ahead of the 45 rpm position, as will be described in more detail hereinafter.

A multi-function control knob 29 is provided which has four positions, namely, an OFF position, a REPEAT PLAY position, an ON position and a REJECT position, from front to back of the changer. When the knob 29 is moved from the OFF position to the ON position the driving motor for the turntable 12 is energized and when the knob 29 is moved to the REJECT position a record changing cycle is automatically initiated. In accordance with an important aspect of the present invention, the record changer mechanism is so arranged that when the knob 29 is first moved to the ON position and then is moved back to the REPEAT PLAY position a slight detent force is exerted on the knob 29, which is not produced when The knob 29 is moved from OFF to ON, and an audible click is produced to inform the operator that he is in the REPEAT PLAY position. With the knob 29 in the REPEAT PLAY position the record changer repeatedly plays the record which is on the turntable 12. As noted above, the REPEAT PLAY position cannot be reached by simply moving the knob 29 from the OFF position to the adjacent REPEAT PLAY position. The knob 29 must first be moved to the REJECT position, so that the turntable motor is turned on, and then moved back to the REPEAT PLAY position. With this arrangement the single knob 29 is employed to provide functions requiring several knobs in conventional changers.

In accordance with a further important aspect of the present invention, the base plate 10 is provided with a central depressed portion 28. Most of the parts of the record changing mechanism per se are mounted on the top and bottom of the central depressed base plate portion 28, which is eccentric with respect to the spindle 18 to permit such mounting, thereby eliminating the conventional base plate subassemblies which are normally employed to mount the operative parts of the record changing mechanism. By employing the central base plate portion 28 as a support for the control levers and other parts of the record changing mechanism, the number of parts required is substantially reduced and in addition the amount of time required to assemble these parts in production is also substantially reduced. More particularly, a cycling gear indicated generally at 30 is rotatably mounted on a post 32 which is secured in the central base plate portion 28 and extends upwardly therefrom, the gear 30 being retained on the post 32 by any suitable means such as the C washer 34. A sleeve bearing 36 is mounted in the eccentric portion 28 of the base plate 10 and the spindle 18 is secured within the bearing 36. A turntable hub 38 is rotatably mounted on the sleeve bearing 36 and rests on a thrust bearing indicated generally at 40 which is positioned about the bottom end of the sleeve 36 and rests on the central base plate portion 28. The hub 38 is retained on the bearing 36 by means of the O-ring 37.

In order to drive the turntable hub 38 a turntable driving motor 40 (FIG. 5) is mounted on the underside of the base plate 10 beyond the portion 28 and the shaft 42 thereof extends upwardly through an opening 44 in the base plate 10. A drive turret having a 45 rpm step 46 and a 33 rpm step 48 is mounted on the shaft 42 above the base plate 10 and a flexible belt 50 is employed to interconnect one of the turret steps 46, 48 with the turntable hub 38, the belt 50 riding on the periphery of the hub 38.

In accordance with an important aspect of the present invention, the turntable 12 is not directly connected to the turntable hub 38, but instead rests on a thin and relatively wide washer 52 which is positioned between the upper surface of the turntable hub 38 and the bottom surface of the turntable 12 adjacent a central depressed portion 54 of the turntable 12. The washer 52 is made of low coefficient of friction material, such as Teflon or the like. With this arrangement, the turntable 12 may be stopped during the record changing cycle, by brake means to be described in more detail hereinafter, so that the turntable 12 is stationary when a record is dropped onto it. This construction also permits the turntable hub 38 to be continuously driven from the motor 40 during the record changing cycle, the washer 52 providing a sufficiently low coefficient of friction bearing to permit stopping of the turntable 12 without placing an excessive load on the motor 40, and without requiring disengagement of the driving means between turntable and turntable hub by some means such as elevating or lowering of either the turntable hub 38 or the turntable 12. A suitable turntable mat 56 may be positioned on the upper surface of the turntable 12 to provide a cushion for records deposited on the turntable 12. The turntable 12 is retained in the hub 38 by means of an O-ring 39 and the central opening in the turntable 12 rides on the upper shaft portion 41 of the hub 38 which acts as a bearing for the turntable during braking.

In order to drive the main cycling gear 30 during a record changing cycle, the turntable hub 38 is provided with pinion gear teeth 58 at the bottom end thereof which are adapted to engage the peripheral gear teeth of the gear 30. However, during the playing cycle the gear 30 is detented in a home position in which a mutilated portion 60 of the gear 30 is opposite the gear teeth 58 so that these teeth are not in mesh during the playing cycle.

In order to initiate a record changing cycle, a single velocity trip lever 62 (FIG. 1) is pivotally mounted on the upper face of the gear 30 by means of a pin portion 61 which is positioned within the central bore of a downwardly extending housing portion 63 (FIG. 5) of the main gear 30, the lever 62 being provided with an upstanding flange portion 66 (FIG. 1) in which a vertically extending shoulder 68 is formed. The shoulder 68 is arranged to be struck by a flange 70 provided on the central sleeve portion of the turntable hub 38 above the gear 58 when the shoulder portion 66 of the velocity trip lever 62 is moved inwardly by a predetermined amount. Movement of the velocity trip lever 62 is effected at the end of the playing cycle by means of a velocity tripping mechanism to be described in more detail hereinafter. As soon as the velocity trip lever 62 has been pivoted by an amount sufficient to bring the shoulder 68 into the path of the flange 70, the gear 30 is rotated by engagement of these members by an amount such that the gear teeth of the turntable hub gear 58 engage the adjacent teeth of the gear 30 and rotate the gear 30 through one revolution during the record changing cycle.

In accordance with an important aspect of the present invention, rotation of the main gear 30 is employed to effect the desired lifting and rotation of the tone arm 14 by means of two members which are interconnected with the tone arm subassembly 20 in such manner that they may be readily disconnected. With this arrangement, the tone arm subassembly 20 may be separately manufactured and tested prior to installation in the base plate 10, after which installation connection may be readily made to the automatic record changing mechanism through these interconnecting elements. Furthermore, these interconnecting elements are so constructed that warping or bending of the base plate 10 does not interfere with the proper operation of the changer during the record changing cycle or introduce errors in the set down adjustment of the tone arm 14 or the velocity tripping mechanism therefor.

TONE ARM LIFTING MECHANISM

Considering first the manner in which the tone arm 14 is lifted off of a record on the turntable 12 at the beginning of the record changing cycle, a tone arm lift rod indicated generally at 72 (FIG. 3) is provided with a right angle end portion 74 which is mounted in spaced apart bearings in the tone arm subassembly 20. More particularly, the tone arm subassembly 20 includes a main housing 76 which is provided with a pair of downwardly extending posts 78 and 80. A plate 82 is mounted on the posts 78 by means of the screws 84 and 86 (FIG. 22). The housing 76 includes an upstanding portion 88 which is provided with a vertically extending bore 90 which is adapted to receive the upper end of the right angle portion 74 of the tone arm lift rod 72. The upper end of the bore 90 is arranged to form a bearing for the upper end of the right angle portion 74 and the plate 82 forms a lower bearing for this right angle end portion 74. As a result, the lift rod 72 is supported by these two spaced apart bearings so that it may be smoothly raised and lowered. The upper end of the right angle end portion 74 is threaded and an adjustable cap 92 is threaded onto the upper end of the right angle end portion 74, the cap 92 being arranged to engage the undersurface of a flat plate portion 94 of the tone arm 14.

The plate 82 is provided with a downwardly extending offset flange portion 96 which has an inclined camming surface 98 formed in the bottom edge thereof. The tone arm lift rod 72 is biased upwardly into engagement with the camming surface 98 by means of a coil spring 100 the bottom end of which is hooked around the tone arm lift rod 72. The spring 100 extends upwardly through an opening 102 (FIG. 22) formed in the plate 82 and into the interior of an upwardly extending housing 104 formed in the plate 82. The upper end of the spring 100 is secured to the top wall of the housing 104. The other end of the lift rod 72 is provided with a right angle end portion 106 which is biased into engagement with a depending cam indicated generally at 108 (FIG. 7), which is formed in the bottom surface of the gear 30, this biasing force being achieved by virtue of the upward force exerted by the spring 100 adjacent the inclined camming surface 98 which tends to rotate the end portion 106 of the lift rod 72 toward the center of the gear 30.

When the gear 30 starts to rotate at the beginning of the record changing cycle the end portion 106, which is continuously biased into engagement with the cam 108 by virtue of the twisting action produced by the upward force of the spring 100 in relation to the inclined camming surface 98, follows the portion 110 of the cam 108 with the result that the lift rod 72 is pivoted about the above-described bearings for the end portion 74 thereof. However, since the spring 100 is continuously urging the lift rod 72 upwardly, as this rod is rotated it is also bodily lifted upwardly as it rides along the cam surface 98. Accordingly, the end portion 106 may be rotated by an amount sufficient to permit the lift rod 72 to be lifted up to the position shown in FIG. 4 wherein the portion 106 of the rod 72 engages the end of the slot 114 (FIG. 25) in the base plate 10. The flange 96 is also provided with stops 111, 112 at either end of the cam surface 98 to limit movement of the rod 72 during assembly. As this upward movement of the lift rod 72 occurs, the cap 92 on the upper end of the end portion 74 of the lift rod engages the plate 94 and lifts the tone arm upwardly off of the record which has just been played on the turntable 12. In this connection it should be noted that the tone arm 14 is shown in FIGS. 3 and 4 in a position over the rest post 22. However, a similar lifting action is provided by the lift rod 72 when the tone arm 14 is resting on a record seated on the turntable 12.

The end portion 106 of the lifted rod 72 extends upwardly through a slot 114 (FIG. 7) formed in the base plate 10 so that the upper portion of the end portion 106 may be biased into engagement with the cam 108 as described heretofore. The spring 100 maintains the lift rod 72 in an elevated position after the end portion 106 has been moved out of engagement with the cam portion 110 so that the tone arm remains in an elevated position during the portion of the record changing cycle during which the next record is being deposited on the turntable and the tone arm is moved inwardly to the correct record size position, as will be described in more detail hereinafter. However, near the end of the record changing cycle the end portion 106 of the lift rod 72 engages the cam portion 116 of the cam 108. The cam portion 116 is not as steep as the cam portion 110 and hence the tone arm is gently lowered to the surface of the record on the turntable 12 as the end portion 106 is engaged by the cam portion 116 and moved outwardly and the lift rod 72 is cammed down the surface 98 against the force of the spring 100. Very close to the end of the record changing cycle the end portion 106 engages an intermediate portion 118 (FIG. 26) of the cam 108. The portion 118 is formed along an arc having the center of the gear 30 as its center so that the biasing force which is exerted by the end portion 106 on the cam 108 and hence the gear 30, is constant and minimized as the gear 30 approaches its home or detent position. In this connection it will be noted that the end portion 106 moves upwardly relative to the cam portion 110 as the lift rod is bodily moved upwardly at the beginning of the record changing cycle. Also the end portion 106 is moved downwardly relative to the cam portion 116 as the tone arm is lowered. However, no upward or downward movement of the end portion 106 relative to the cam portion 118 is experienced as the end portion 106 traverses the cam portion 118 so that minimal forces are exerted on the gear 30 as it approaches the detent position. In this connection it will be noted that raising and lowering of the tone arm 14 is achieved solely in response to rotation of the end 106 of the lift rod 72 as controlled by the cam 108 so that an extremely simple and yet efficient and smoothly acting tone arm lift arrangement is provided in accordance with the present invention. Furthermore, it is pointed out that the amount of lift is determined at the tone arm subassembly 20 by the cam surface 98 and warpage of the base plate does not change the height of the tone arm lift as it would with conventional linear motion slides which are directly connected to the main cycling gear. It is also pointed out that the lift rod 72 functions smoothly with relatively little force because the cam surface 98 is positioned quite a distance from end portion 74 about which the rod 72 pivots. This construction permits the cam surface 98 to have a gradual slope, whereas if this cam were placed close to the end 74 it would have to be relatively steep and substantial additional force would be required to move along it. However, the cam surface 98 can be spaced away from the end 74 only because spaced apart bearings are provided for the end 74, as described heretofore, so that the rod 72 may be lifted smoothly and with little force exerted thereon.

HORIZONTAL TONE ARM MOVEMENT

Figure 11:
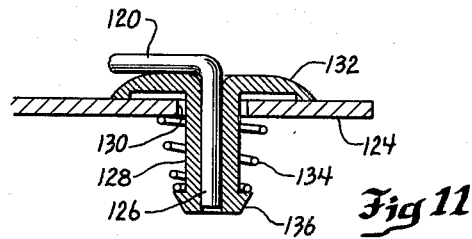
FIG. 11 is a sectional view taken along the line 11—11 of FIG. 10.

Considering now the manner in which the tone arm 14 is moved horizontally, in accordance with an important aspect of the present invention a drive trip link 120 is employed to interconnect the gear 30 with the tone arm 14 so that the tone arm is moved outwardly during the first portion of the record changing cycle and is then moved inwardly over the record which has been deposited on the turntable 12 and into engagement with the lead-in groove of this record. The drive trip link 120 also acts as a velocity trip actuating member during the playing cycle. The link 120, which may be simply a stiff wire, is connected to the gear 30 at a point offset from the center thereof by means of a clutch mechanism indicated generally at 122. The other end of the link 120 is connected to a tone arm quadrant member 124 (FIG. 2) which is connected to and moves with the tone arm 14 by means to be described in detail hereinafter. More particularly, the link 120 is provided with a right angle end portion 126 which extends through the central opening in a bushing 128 which is loosely positioned in a slot 130 formed in the quadrant 124. As best illustrated in FIG. 11 the bushing member 128 is provided with a head portion 132 which rides on the upper surface of the quadrant 124 beyond the edges of the slot 130. A light coil spring 134 is positioned between an enlarged end portion 136 at the bottom of the bushing 128 and the underside of the quadrant 124 so that a light clutch force is provided to prevent the member 128 from moving within the slot 130 unless this force is overcome. However, when the member 128 is moved into engagement with either end of the slot 130 a positive drive connection is provided between the link 120 and the quadrant 124.

Figure 8:
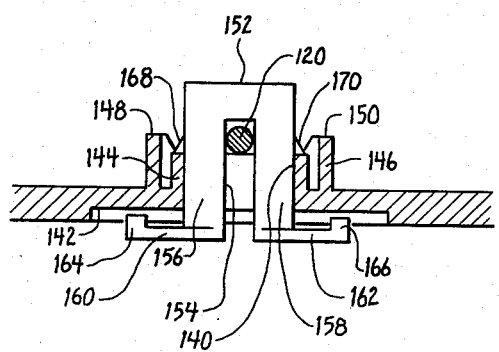
FIG. 8 is a sectional view taken along the lines 8—8 of FIG. 1 and showing the tone arm drive-trip clutch in its rest position.

Considering now in more detail the clutch 122, an opening 140 is formed in the main gear 30 which communicates with a recess 142 of larger diameter on the underside of the gear 30. A central annular wall 144 is formed in the gear 30 adjacent the opening 140 and an outer annular wall 146 is also formed in the gear 30, the outer wall 146 having a pair of opposed cam actuating shoulders 148 and 150 formed therein which project upwardly above the top of the central annular wall 144. A clutch drive pivot 152 is loosely mounted for rotation in the opening 140 in the gear 30 and is provided with a narrow slot 154 which extends upwardly from the bottom of the member of the pivot 152 and is adapted to receive the end portion of the drive-trip link 120. The legs 156 and 158 which are formed in the pivot 152 by virtue of the slot 154 are provided with offset flexible end portions 160 and 162 which terminate in feet 164 and 166 which are adapted to engage the recess 142 of the gear 30 when the pivot 152 is moved to an elevated position within the opening 140. The pivot 152 is also provided with opposed shoulders 168 and 170 which are adapted to rest on the upper surface of the central annular wall 144 when the pivot 152 is in the declutched or velocity tripping position shown in FIG. 8. In order to assemble the pivot 152 within the gear 30, the opening 140 is provided with opposed grooves 172 and 174 (FIG. 14) which permit the pivot 152 to be inserted upwardly through the opening 140 after which the pivot 152 is rotated and the end of the drive-trip link 120, which is inserted into the groove 154 and can then rest on the upper surface of the wall, as shown in FIG. 8.

Considering now the operation of the above-described clutch 122 and drive-trip link 120 in moving the tone arm 14 outwardly to the rest post 22 and then returning the tone arm to the desired set down position during the record changing cycle. During the initial portion of the record changing cycle, while the tone arm 14 is being lifted off of the record as described heretofore, the clutch 122 does not interconnect the gear 30 with the link 120 so that no outward movement of the tone arm is produced during the tone arm lifting operation. This is because the link 120 remains loosely positioned within the slot 154 of the drive pivot 152 as the gear 30 is moved from the position shown in FIG. 13 to the position shown in FIG. 14. During this movement of the gear 30 the drive pivot 152 is however rotating slightly relative to the gear 30 since the pivot 152 is maintained in alignment with the link 120 by virtue of the fact that the link 120 extends through the transverse slot 154 in the pivot 152.

Figure 9:
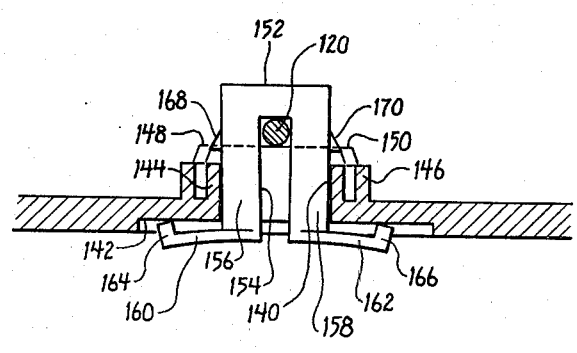
FIG. 9 is a sectional view similar to FIG. 8 but showing the tone arm clutch in its tone arm drive position.
Figure 2:
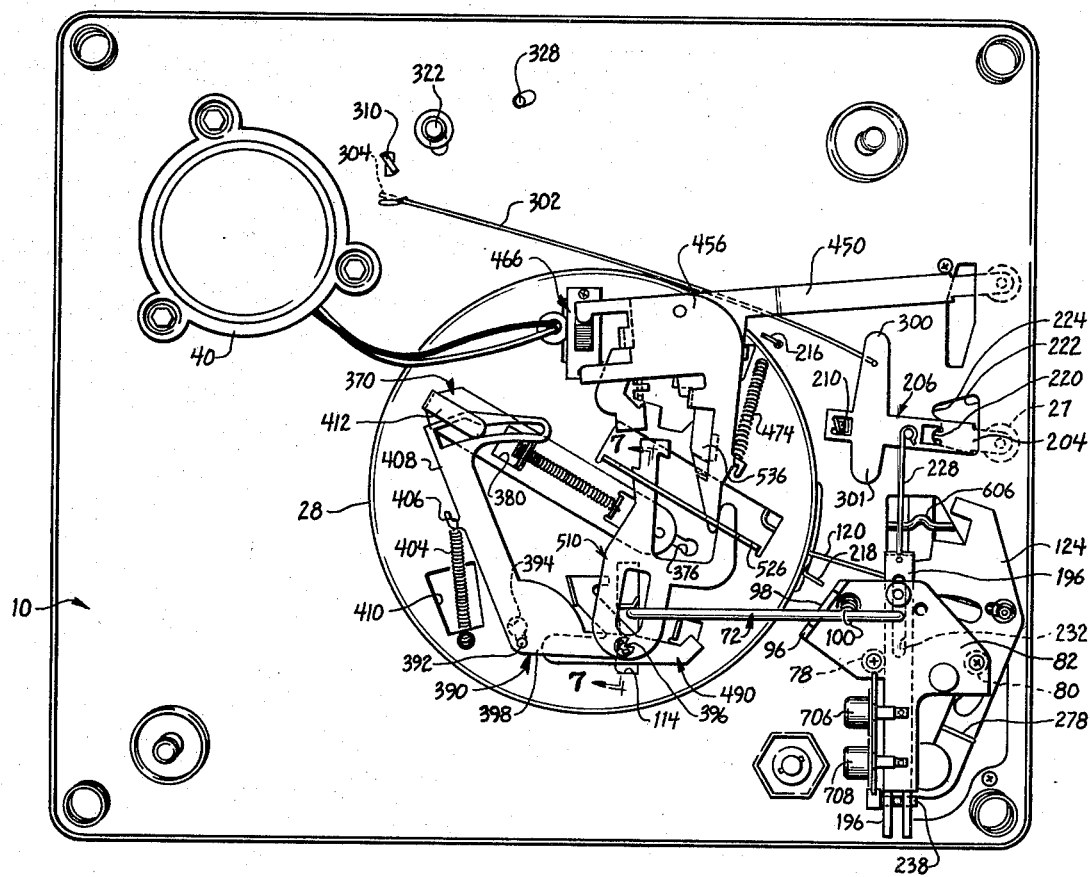
FIG. 2 is a bottom view of the record changer of FIG. 1.
Figure 10:
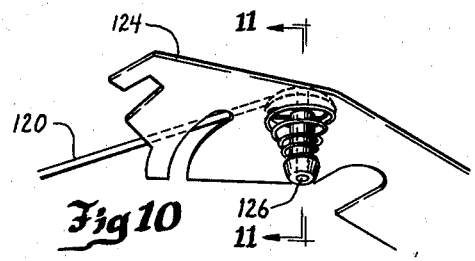
FIG. 10 is a perspective view of the velocity trip clutch employed in the changer of FIG. 1.
Figure 14:
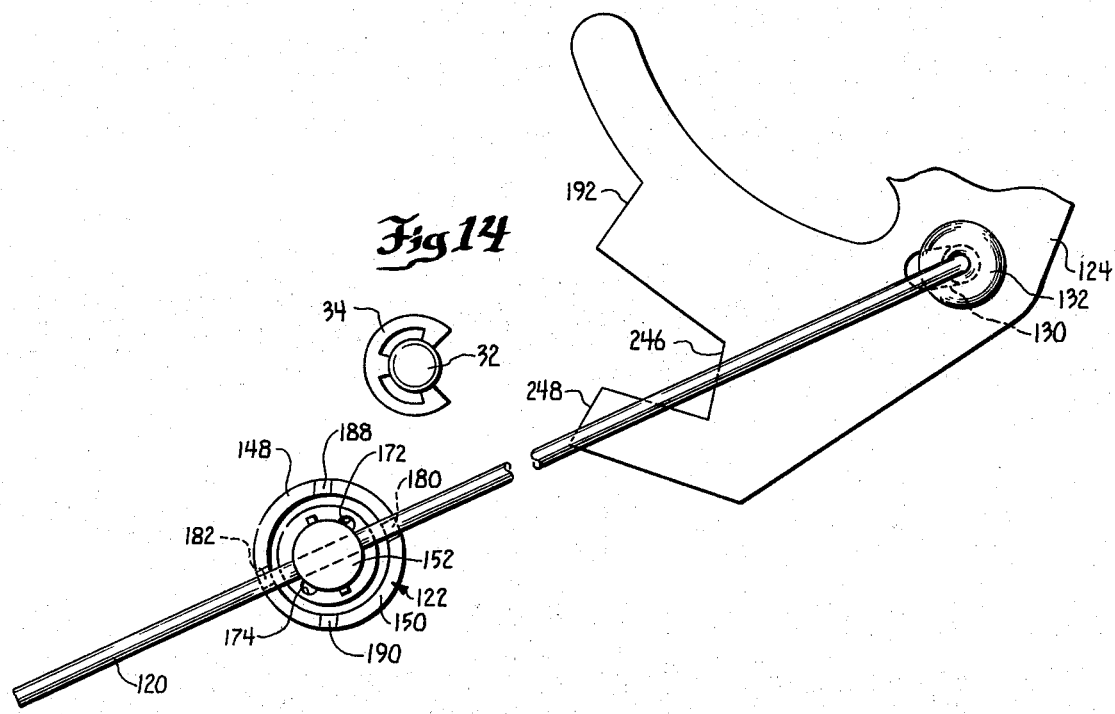
Figure 23:
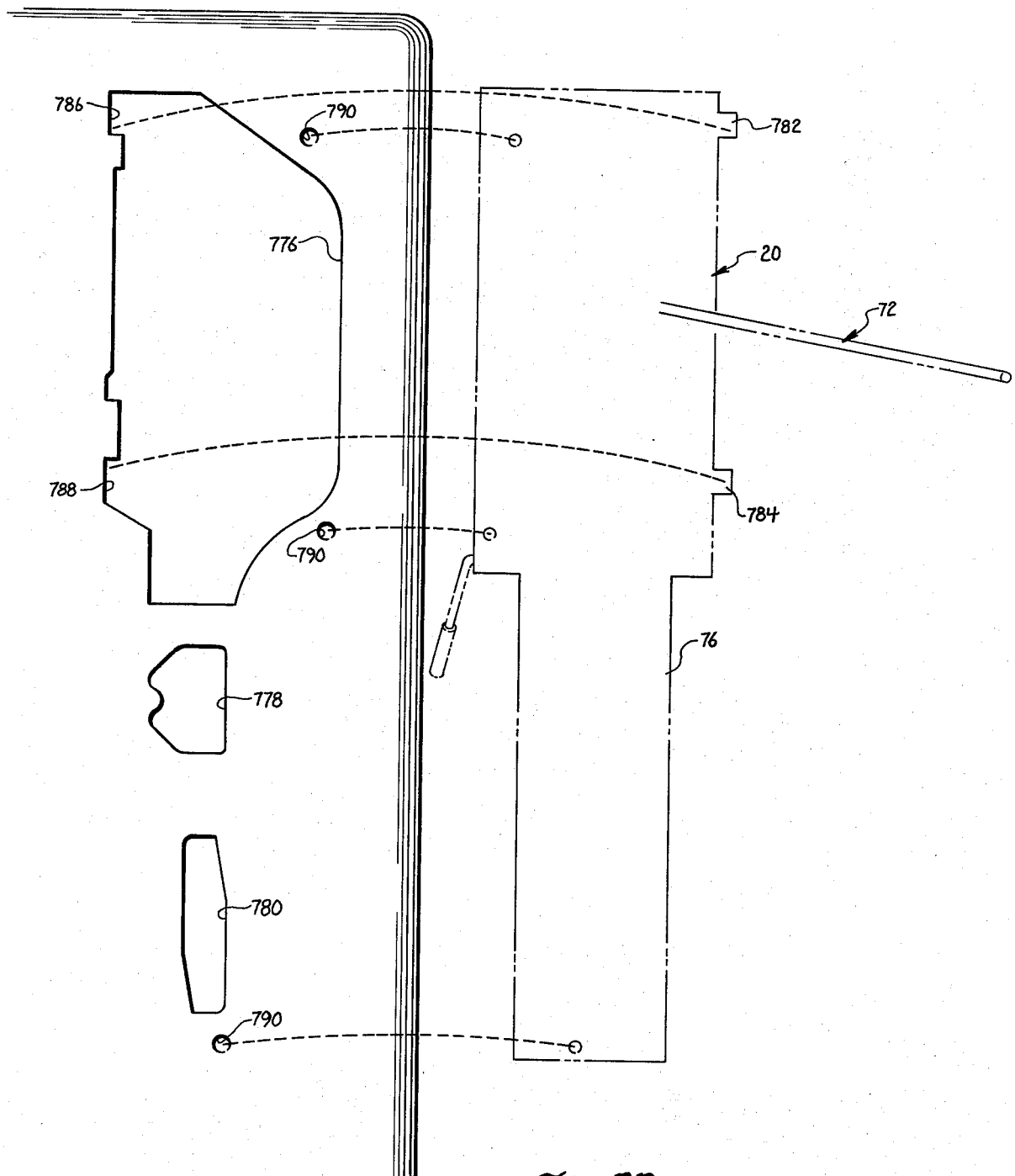
FIG. 23 is a view similar to FIG. 22 but showing the manner in which the tone arm subassembly is assembled on the base plate.

When the gear 30 approaches the position shown in FIG. 14 the link 120 rides up the inclined portions 180, 182 formed in the outer wall 146 and onto the upper surface of the opposed shoulders 148, 150. As this occurs, the link 120 engages the top of the groove 154 and lifts the pivot 152 upwardly until the feet 164, 166 thereof are biased into engagement with the recess 142 in the gear, as shown in FIG. 9. The shoulders 148, 150 are made of sufficient height that the feet 164, 166 engage the gear 30 with sufficient force to clutch the drive-trip link to the gear 30 as the gear continues to rotate. However, this frictional force is not so great as to prevent the pivot 152 from rotating relative to the gear 30 since the pivot 152 must remain aligned with the link 120 which extends through the notch 154 therein, and the other end of the link 120 is pivotally connected to the quadrant 124 of the tone arm mechanism, as described in detail heretofore. During this rotary movement of the pivot 152 with respect to the gear 30 the feet 164, 166 slip along the surface of the recess 142 while maintaining the above-described frictional force for the link 120.

As soon as the link 120 is moved upwardly into engagement with the upper surface of the shoulders 148, 150 the link 120 becomes clutched to the gear 30 and as the gear continues to rotate the link 120 moves outwardly. If the velocity trip clutch bushing 128 is not positioned at the rear of the slot 130 in the quadrant 124, this initial outward movement of the link moves the member 124 to the outer end of slot 130 after which point the tone arm 14 is moved outwardly with the link 120 as the gear continues to rotate. The tone arm 14 is moved outwardly until it engages a blocking shoulder 184 on the rest post 22 the shoulder 184 extending upwardly a substantially greater distance than the inner shoulder 186 of the rest post 22. The relative position of the link 120 and the clutch 122 as the tone arm is moved into engagement with the rest post shoulder 184 is shown in FIG. 15.

Since the tone arm cannot move further outwardly when it engages the shoulder 184, as the gear 30 continues to rotate the clutch 122 permits such further rotation by slippage between the link 120 and the clutch 122. More particularly, while the frictional force with which the feet 164, 166 engage the gear 30 is sufficient to move the tone arm outwardly, as described heretofore, this force is not too great that it cannot be overcome when the tone arm strikes an obstruction such as the shoulder 184. When such an obstruction is encountered the link 120 slides over the upper surface of the shoulders 148, 150 and also slides relative to the pivot 152 by virtue of a sliding action of the link 120 in the bottom of the groove 154. Accordingly, as the gear 30 continues to rotate from the position shown in FIG. 15 to the position shown in FIG. 16 the clutch 122 continues to urge the tone arm against the shoulder 184 while the link 120 slides relative to the clutch 122 to the position shown in FIG. 16. However, as soon as the link 120 rides down the inclined portions 188, 190 formed in the outer wall 146 the feet 164, 166 of the pivot 152 are no longer biased into engagement with the gear 30 so that the link 120 becomes disengaged from the gear 30 while the tone arm 14 remains in its position in contact with the shoulder 184 of the rest post 22.

After the gear 30 has been rotated to the position shown in FIG. 17 the link 120 again rides up the inclined portions 180, 182 so that the gear 30 again becomes clutched to the link 120. As the gear 30 continues to rotate from the position shown in FIG. 17 to the position shown in FIG. 18 the link 120 is first moved so that the velocity trip clutch bushing 128 is moved to the forward end of the slot 130 and thereafter the link 120 functions to move the tone arm inwardly. By disconnecting the link 120 from the gear 30 during travel from the position shown in FIG. 17, the tone arm can remain in its position over the rest post for a longer period of time while the next record is being deposited on the turntable 12. This inward movement of the tone arm quadrant 124 continues until the twelve-inch record positioning shoulder 192, which is formed in the quadrant 124, strikes the upturned flange portion 194 of a size selector slide 196. The slide 196 is manually positioned at the twelve-inch position by means to be described in more detail hereinafter. When the shoulder 192 of the quadrant 124 strikes the size selector flange 194 further inward movement of the tone arm is prevented. However, since the gear 30 continues to rotate the clutch 122 again permits sliding movement of the link 120 relative to the shoulders 148, 150 and the pivot 152, as described heretofore in connection with FIGS. 15 and 16. It should be noted that as the gear rotates from the position shown in FIG. 18 to the position shown in FIG. 19, a constant pull is exerted on the link 120 so that the velocity trip clutch bushing 128 remains positioned at the forward end of the slot 130 in the quadrant 124. The velocity tripping mechanism is thus continuously urged to the proper reset position of the velocity trip clutch during movement of the gear from the position shown in FIG. 18 to the position shown in FIG. 19.

When the gear 30 reaches the position shown in FIG. 16 the link 120 rides down the shoulders 188, 190 so that the gear 30 thereafter becomes disconnected from the link 120 as the gear 30 is returned to the detent or home position shown in FIG. 1. In the detent position the link 120 is completely free to move since the pivot 152 is now supported by engagement of the shoulders 168, 170 thereof with the upper surface of the inner wall 144. Furthermore, the link 120 is positioned approximately midway between the shoulders 148, 150 and rests loosely within the slot 154 in the pivot 152, as shown in FIG. 8.

VELOCITY TRIPPING MECHANISM

In accordance with an important aspect of the present invention the link 120 is also used during the playing cycle as a velocity trip actuating member. More particularly, the link 120 is moved to the position hown in FIG. 1 at the start of the playing cycle with the velocity trip clutch member 128 positioned at the forward end of the slot 130. As the tone arm moves inwardly over the record during the playing cycle the link 120 moves with the tone arm quadrant 124 due to the light force exerted by the spring 134 on the under side of the tone arm quadrant 124. This light force is sufficient to move the link 120 axially through the slot 154 in the drive pivot 152 without disturbing the position of the velocity trip clutch member 128 relative to the slot 130. Since the link 120 rests loosely upon the inner wall 144 of the gear 30 during this movement, an extremely light clutch force can be supplied by the spring 134.

As the tone arm nears the end of the record the link 120 is moved to a position where the end thereof engages the upstanding flange 66 of the velocity trip lever 62 which is pivotally mounted on the gear 30. The lever 62 is mounted on the gear 30 so that it may be moved with a very light force and hence the end of the link 120 moves the lever 62 without moving the bushing 128 within the slot 130. However, as the tone arm nears the end of the record the flange 70 on the turntable hub 38 strikes the edge portion 67 (FIG. 16) of the flange 66 adjacent the shoulder 68 each revolution and moves the lever 62 and hence the link 120 outwardly a slight amount against the force of the velocity trip spring 134. This force is, of course, not sufficient to interfere with inward stylus tracking of the record over the last few grooves of the record. As a result, the bushing 128 is moved rearwardly in the slot 130 as the last few playing grooves of the record are encountered.

When the runout groove of the record is encountered the link 120 is moved rapidly inwardly with the tone arm so that the lever 62 is pivoted by a substantial amount and the shoulder 68 thereof is moved into the path of the flange 70 on the turntable hub 38. When the flange 70 strikes the shoulder 68 the gear 30 is rotated slightly so as to initiate a record changing cycle in the manner described in detail heretofore. This velocity tripping action of the link 120 is made possible by virtue of the fact that the clutch 122 disconnects the link 120 from the gear 30 in the detent position of the gear 30 as described in detail heretofore. In this connection it will be noted that the velocity trip clutch connection of the link 120 to the quadrant 124 is always reset to the maximum range during the record changing cycle because the bushing 128 is pulled to the forward end of the slot 130 by the link 120 as the gear 30 rotates. Furthermore, this resetting action lasts until near the end of the record changing cycle when the gear 30 becomes disconnected from the link 120 (FIG. 19). This positive resetting of the bushing 128 also positions the end of the link 120 correctly in relation to the tone arm 14. Accordingly, the position of the velocity tripping pawl 62 when it is initially engaged by the end of the link 120 may vary without interfering with proper velocity tripping since the link is correctly registered with respect to the tone arm at the start of the playing cycle. However, the pawl 62 is prevented from moving into the path of the flange 70 as the gear 30 is detented by proper choice of the gears 58 and 30. Preferably, the ratio of teeth 58 on the hub 38 to the ratio of teeth on the gear 30 is such that there is an even ratio plus two teeth on the gear. As the gear 30 is detented the gears 58, 30 are timed so that the flange 70 is in the path of the edge portion 67 of the velocity trip pawl 62 and hence prevents the pawl 62 from moving outwardly by an amount sufficient to position the shoulder 68 in the path of the flange 70. Preferably, the gear 58 has twenty-one teeth and the gear 30 has 128 teeth.

It is also pointed out that the above-described velocity trip clutch may be eliminated and the link 120 pivotally connected directly to the quadrant 124. In such case a two-part (or more) velocity trip pawl arrangement may be employed instead of the single pawl 62, as will be readily understood by those skilled in the art. However, such twoplate velocity trip mechanisms are subject to random alignment which is usually overcome by providing more friction between the two plates. When such heavy friction is employed, velocity tripping with light tone arm forces in the order of one gram or less is not possible, whereas with the velocity tripping arrangement described in detail heretofore reliable velocity tripping is provided with tone arm forces of less than one gram.

The velocity tripping pawl 62 may be reset to its initial or rest position shown in FIG. 1 by any one of a number of arrangements. One such arrangement is shown in FIG. 16 wherein the intermediate portion of the link 120 is employed to reset the pawl 62 as the gear 30 is moved from the position shown in FIG. 16 to the position shown in FIG. 17. More particularly, as the gear 30 continues to rotate from the position shown in FIG. 16, the inclined top edge 200 of the flange portion 66 of the pawl 62 strikes the link 120. As the link 120 cams upwardly over the edge 200 the pawl 62 is moved inwardly away from the edge of the gear to the position shown in FIG. 1 as the link 120 rides over the top surface of the flange 66. In the alternative the gear teeth 58 of the turntable hub 38 may engage the outwardly projecting portion 67 of the pawl 62 and move this pawl back to its initial position shown in FIG. 1 as the gear 30 approaches the detent position at the end of the record changing cycle.

RECORD SIZE SELECTION

Considering now the manner in which the size selector slide 196 is positioned for seven-inch or twelve-inch records, it will be recalled from the general description heretofore, that the control knob 27 is employed as a combined record size and speed selector and may be moved between either a 33⅓ rpm position or a 45 rpm position. The control knob 27 is connected to an arm portion 204 of a speed-size lever 206 (FIG. 6), the portion 204 extending out beyond the edge of the tone arm housing 20 through a slot 208 provided therein. The lever 206 is pivotally mounted beneath the base plate 10 by means of a tongue portion 210 which extends upwardly through an opening 212 in the base plate 10. A spring wire 214 engages the tongue 210 on the top surface of the base plate 10, one end of the wire 214 being provided with an offset end portion which extends downwardly through an opening 216 in the base plate 10 and the other end of the wire 214 being provided with an offset end portion 218 which is positioned beneath the base plate 10. The lever 206 is provided with an upturned flange 220 (FIG. 13) which rides in an opening 222 in the base plate 10 and is urged against the wall 224 thereof by the spring 214. The wall 224 defines a pair of detent positions for the knob 27 corresponding to the twelve-inch 33⅓ rpm position or the seven-inch 45 rpm position. The control lever 206 is provided with a downwardly extending post 226 (FIG. 6) which is connected to the size selector slide 196 by means of a wire link 228. One end of the link 228 is provided with an offset end portion 230 which extends into an opening in the slide 196 and the other end of the wire 228 is snapped into a groove at the bottom end of the post 226.

Movement of the size selector slide 196 is guided by means of a slot 232 (FIG. 22) in the slide 196 through which the right angle end portion 74 of the tone arm lift rod 72 extends, and a slot 234 in the end of the size selector slide 196 which is positioned by means of a pin portion 236 (FIG. 6) which extends downwardly from a stud 238 formed in the tone arm base member 76. The stud 238 is of rectangular cross section so that portions thereof adjacent the pin 236 act as a fulcrum for the end of the size selector slide 196. The slide 196 is continuously urged upwardly by means of a flexible arm portion 240 of the plate 82, the arm 240 being provided with the right angle end portion 242 which engages the underside of the slide 196 adjacent the fulcrum formed by the stud 238.

The flexible arm 240 pivots the size selector slide 196 about the fulcrum formed by the stud 238 so that the slide 196 is biased into engagement with a pair of projecting lug portions 244 (FIG. 6) formed on the opposite sides of the right angle end portion 74 of the tone arm lift rod 72. Accordingly, the size selector slide 196 is continuously biased by the arm 240 to follow vertical movements of the lift rod 72. When the lift rod 72 is elevated at the beginning of the record changing cycle to raise the tone arm off of the record, as described in detail heretofore, the size selector 196 is also permitted to move upwardly under the slight spring force exerted thereon by the flexible arm 240. At the beginning of the record changing cycle the tone arm quadrant 124 has not moved outwardly and hence the upstanding flange portion 194 of the slide 196 initially engages the undersurface of the quadrant 124. However, when this quadrant is moved outwardly by the link 120, as described in detail heretofore, the size selector slide 196 is permitted to move upwardly to the position shown in FIG. 4 wherein the slide 196 is disengaged from the projections 244. In the position shown in FIG. 4, the edge of the flange 194 is positioned to engage the twelve-inch shoulder 192 of the quadrant 124 when the tone arm is again moved inwardly, as described in detail heretofore in connection with FIG. 18.

When the speed control knob 27 is turned to the seven-inch 45 rpm position the post 226 depending therefrom, and hence the slide 196, is moved to the left, as viewed in FIG. 6 so that the flange portion 194 of the slide 196 is now positioned to engage the seven-inch shoulder 246 (FIG. 18) formed in the quadrant 124. When the flange 194 is in engagement with the shoulder 246 of the quadrant 124 during a record changing cycle the tone arm 14 is positioned to engage the lead-in groove of a seven-inch record positioned on the turntable 12.

As discussed generally heretofore, the record changer of the present invention may also be arranged to play ten-inch 78 rpm records. To this end, the quadrant 124 is provided with a shoulder 248 which is positioned to be engaged by the flange portion 194 of the slide 196 and position the tone arm 14 for ten-inch records. If ten-inch 78 rpm records are to be played, the opening 222 in the base plate 10 is provided with a third detent lobe which is nearer the front of the changer than the 45 rpm detent position. When the control lever 206 is moved to this 78 rpm position the slide 196 is correctly positioned to engage the quadrant shoulder 248. It will be noted that the successive detent positions of the lever 206 are arranged in order of increasing turntable speed rather than increasing record size, the shoulders 192, 246 and 248 being arranged on the quadrant 124 to correlate with the respective positions of the combined speed-size control knob 27.

TONE ARM MOUNTING MECHANISM

Considering now the manner in which the tone arm 14 is mounted for rotational and pivotal movement on the tone arm subassembly base member 76, a tone arm support post 250 (FIG. 6) is pivotally mounted between the upper end of a sleeve housing 252 formed in the tone arm subassembly plate 76 and a well portion 254 formed in the support plate 82. To this end, a yoke 256 is secured to the recessed end portion 258 of the post 250 by means of the nut 260 which is threaded onto the upper threaded end of the post 250. The yoke 256 is provided with a sleeve portion 262 which extends downwardly into the top of the housing 252 and is positioned between the housing 252 and the upper end of the post 250. The sleeve 262 thus acts as the upper bearing for the post 250. The post 250 is provided with a tapered end portion 264 which is seated in the well 254 to provide the bottom pivot for the post 250. The upper portion 258 of the post 250 is provided with a double D cross section which cooperates with a similarly shaped opening in the yoke 256 so that the yoke 256 is accurately positioned relative to the post 250 when the sleeve 262 is inserted into the housing 252 and the nut 260 secured.

Figure 13:
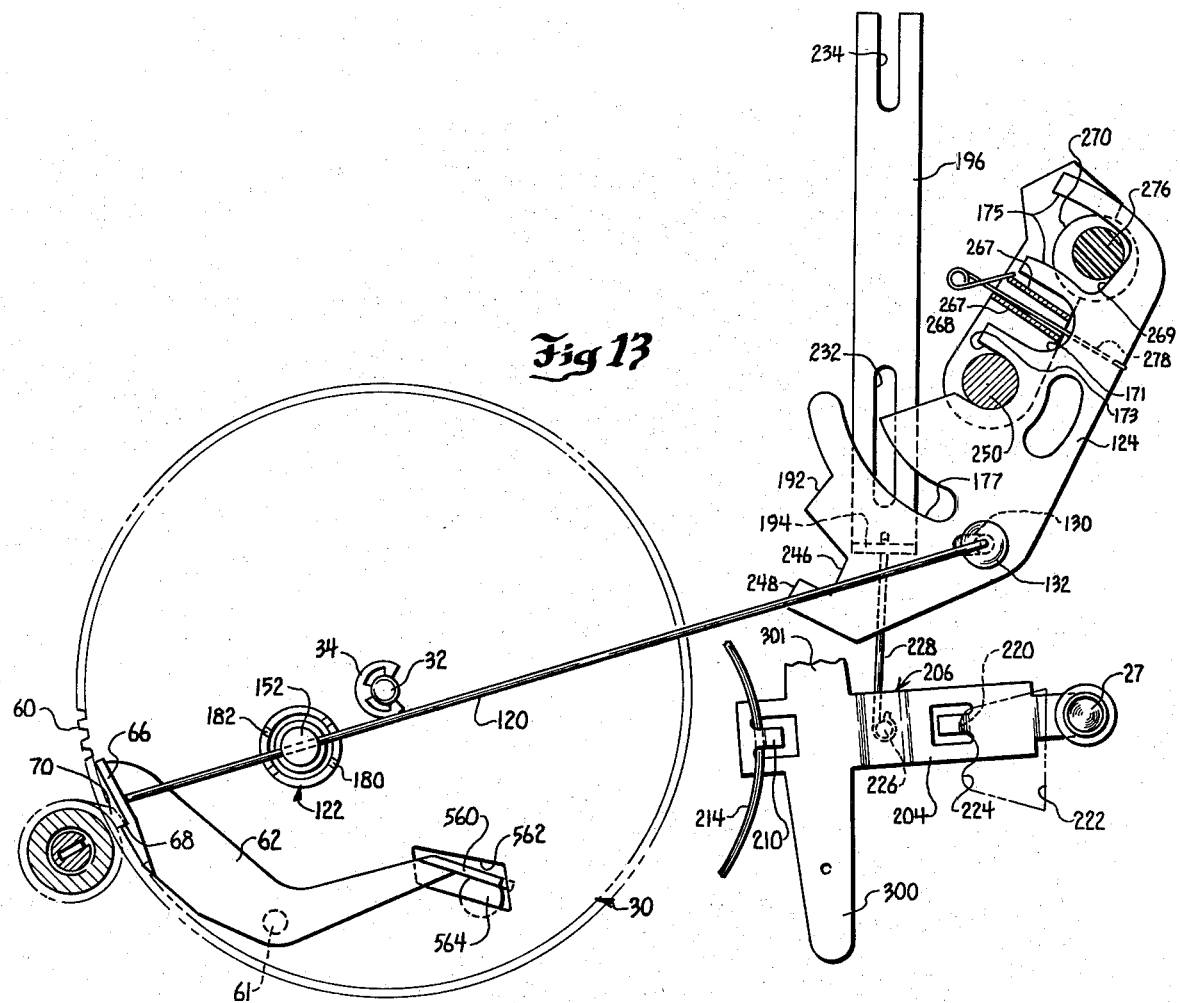
FIG. 13 is a fragmentary plan view illustrating in diagrammatic form the operation of the drive-velocity trip mechanism of the changer of FIG. 1 in initiating a record changing cycle and showing the main gear in the home or detent position.

The quadrant 124 is positioned between two transversely extending blade portions 266 and 268 which are formed integrally with the post 250 and are provided with openings which are adapted to receive the head portions 270, 272 of a set-down adjustment member 274. The member 274 is provided with an eccentric intermediate portion 276 which is biased into engagement with a slot in the quadrant 124 by means of the spring 278. The upper end of the set-down adjustment member 274 extends through a slot 280 in the upper wall of the tone arm housing 76 and is provided with a slotted adjustment head 282 by means of which the member 274 may be rotated. The portions 266 and 268 are connected by integrally-formed ribs 267 and the spring 278 extends between the ribs 267 and loads the quadrant 124 against the eccentric portion 276 and the post 250. To this end the quadrant 124 is provided with a first notch 269 for the eccentric portion 276 and a clearance slot 171 to accommodate the ribs 267 and spring 278 (FIG. 13). The quadrant 124 is also provided with a bearing slot 173 for the post 250. The head portions 270, 272 ride in arcuate slots 175 in the portions 266, 268. The quadrant 124 is also provided with a clearance slot 177 which permits the tone arm 14 to move relative to the lift rod 74. When the member 274 is rotated the quadrant 124 is moved relative to the tone arm yoke 256 so that an adjustment of the set-down position of the tone arm 14 may be made.

The yoke 256 is provided with the upstanding arm portions 284, 286 and the tone arm plate 94 is provided with ear portions 288, 290 (FIG. 1) which are adapted to be mounted in the upstanding arms 284, 286 of the yoke 256. In this connection it will be understood that any other suitable tone arm arrangement may be mounted on the post 250 insofar as the present invention is concerned. However, such tone arm arrangement must have a smooth undersurface equivalent to the plate 94 against which the cap 92 may ride as the tone arm 14 is moved outwardly and inwardly during the record changing cycle.

RECORD SPEED SELECTION

Considering now the manner in which the belt 50 is shifted from the turret 48 to the turret 46, and vice versa, in accordance with movement of the speed-size control lever 206, the lever 206 is provided with an offset arm portion 300 (FIG. 2) to the end of which is secured a control wire 302. The lever 206 is also provided with an arm 301, extending in the opposite direction from the arm 300, which rides on the under surface of the base plate 10 and prevents the lever 206 from twisting as it is moved between the 33⅓ rpm and 45 rpm positions. The wire 302 extends beneath the base plate 10, around the depressed central base plate portion 28 thereof and extends upwardly through an elongated slot 304 formed in the base plate 10.

ANTI-SKATE MECHANISM

Considering now the facilities which are provided in accordance with the present invention to prevent the needle of the tone arm 14 from skating across the initial grooves of the record as the tone arm lands on the lead-in groove portion of the record, it will be recalled from the above description of the size selector slide 196 that this member is biased upwardly by means of the flexible arm 240 and after the quadrant 124 has been moved free of the right angle flange 194 on the slide 196 this slide is moved upwardly by the arm 240 to the position shown in FIG. 4. When the slide is in the position shown in FIGS. 4 and 21 the vertical edge of the flange portion 194 of the slide 196 is positioned in the path of the quadrant 124 and hence the shoulder 192 on the quadrant 124 is moved into contact with the lower portion of this vertical edge when the gear is in the position shown in FIG. 18.

In accordance with an important aspect of the present invention a controlled and limited skating action is provided for the tone arm 14 after it lands on the record to permit the stylus to find the lead-in groove of the record without skating across the initial recorded grooves of the records. This controlled skating action is accomplished by making the upper portion 340 of the vertical edge of the flange 194 slightly inclined with respect to the vertical. With such an arrangement, when the slide 196 is lowered in synchronism with the tone arm lift rod 72 at the end of the record changing cycle, by engagement of the projections 244 with the upper surface of the slide 196, the slide 196 is moved downwardly as the tone arm is lowered onto the record. The stylus engages the record when the quadrant is even with the bottom end of the inclined edge 340. Accordingly, as the slide 196 continues to be lowered the slight incline of the edge 340 permits the quadrant 124, and hence the tone arm 14, to skate inwardly over the slick surface of the record in a controlled manner until it engages the lead-in groove of the record. However, the tone arm is prevented by this arrangement from skating inwardly in an uncontrolled manner over the initial recorded grooves of the record. This action is shown in FIG. 21 wherein the lowered position of the slide 196 is shown in dotted lines at 342. As the slide 196 is lowered to the position shown at 342, the quadrant 124 is permitted to move slightly inwardly as the shoulder 192 thereof moves up the inclined edge 340 of the flange portion 194 of the slide 196. In this connection it will be understood that at the end of the record changing cycle the slide 196 is moved downwardly by an additional amount sufficient to position the flange 194 entirely below the bottom surface of the quadrant 124 so as to permit the tone arm to move inwardly over the record during the playing cycle. Thus, the controlled and limited skating action of the inclined edge 340 occurs only for a brief interval after the tone arm has landed on the record.

An additional anti-skate provision may be made whereby a constant outward bias is exerted on the tone arm at all times. To this end, a downwardly-extending post 346 is formed on the projecting arm portion 268 of the tone arm post 250 and a spring 348 is connected from the bottom end of the post 346 to a downwardly projecting post portion 350 formed in the tone arm base member 76. The spring 348 exerts a slight outward force on the tone arm at all times and hence is effective to provide an additional anti-skate force on the tone arm as it lands on the lead-in groove portion of the record. Also, the constant bias provided by the spring 348 during the playing cycle is desirable from the standpoint of minimizing wear on the records, as will be readily understood by those skilled in the art. It will be noted from FIG. 22 that as the tone arm is moved inwardly over the record, the post 346 moves in an arc about the center of the tone arm post 250 so that the spring 348 is not lengthened appreciably and hence provides a substantially constant biasing force on the tone arm 14 during the playing cycle.

When the biasing spring 348 is employed to provide a constant bias on the tone arm 14 at all times, it continuously tends to move the tone arm outwardly. Accordingly, when the stylus lands on the slick surface of the record the spring 348 may tend to pull the tone arm 14 off of the record. To prevent this, a slight frictional force may be exerted on the quadrant 124 during the record changing cycle. To provide such a frictional force, a plunger indicated generally at 352 (FIG. 6) is mounted in a housing portion 354 which extends downwardly from the plate 82. The bottom wall of the housing 354 is provided with an opening through which the end portion 356 of the plunger 352 extends. Plunger 352 is thus captivated between quadrant 124 and the housing 354. A coil spring 358 is positioned between the bottom wall of the housing 354 and the larger diameter intermediate portion of the plunger 352 within the housing 354. The upper end 360 of the plunger 352 is of reduced diameter so as to define a shoulder which is positioned below the size selector slide 196. When the record changer is in a playing cycle, or is turned off, the slide 196 is in engagement with this shoulder and holds the plunger 352 downwardly so that the upper end of the portion 360 thereof is positioned below the bottom surface of the quadrant 124.

When the tone arm lift rod 72 is elevated at the beginning of a record changing cycle the size selector slide 196 is moved upwardly by an amount sufficient to permit the top portion 360 of the plunger 352 to engage the underside of the quadrant 124. Accordingly, a slight force is exerted, by means of the spring 358, on the plunger 352 and hence against the underside of the tone arm quadrant to provide the desired friction during the record changing cycle. It will be noted that the plunger 352 is permitted to engage the quadrant 124 even though the flange 194 of the selector slide 196 strikes the underside of the quadrant 124. Accordingly, the frictional force exerted by the plunger 352 is exerted on the tone arm as soon as it is lifted off of the record and before it is moved outwardly by an amount sufficient to clear the upstanding flange 194 of the slide 196. This frictional force is continuously exerted on the quadrant 124 until the slide 196 has been lowered below the position indicated in dotted lines at 342 in FIG. 21 so that this frictional force is present as the stylus lands on the record and engages the lead-in groove thereof. This force is not removed until the end of the record changing cycle when the upper edge of the flange 194 has been moved below the quadrant 124. The frictional force exerted by the plunger 352 on the quadrant 124 also functions to smooth out movement of the tone arm 14 during the record changing cycle. In this connection it is pointed out that the top portion 360 of the plunger 352 also rides in the slot 232 formed in the size selector slide 196 for different-sized records, as described in detail heretofore.

LAST RECORD SENSING AND SHUT-OFF

In the record changer of the present invention, the last record sensing mechanism is combined with the record ejecting mechanism provided at the spindle 18. With this arrangement the balance arm may be of simple construction and need not include any last record shut-off facilities as is conventional in many changers. Furthermore, by accomplishing the last record sensing in the area of the spindle 18 and gear 30, the record changer mechanism is substantially simplified and no interconnection with the tone arm mechanism other than the above-described members 72 and 120 is required. This arrangement has the further advantage of rendering the record changer less sensitive to warpage and bending of the main base plate 10 and hence misalignment of the tone arm area with respect to the center of the base plate.

In accordance with an important aspect of the present invention, the last record sensing operation is accomplished by movement of the record ejector blade in the same direction as this blade moves to eject a record from the shelf of the spindle 18. Such an arrangement substantially simplifies the last record sensing mechanism, as will be described in more detail hereinafter. Considering first the elements provided for ejecting a record from the shelf of the spindle 18, a push-off slide 370 (FIG. 5) is slidably mounted beneath the central portion 28 of the base plate 10. More particularly, the slide 370 is provided with a cam follower pin 372 which is secured to one end of the slide 370. The pin 372 is provided with a groove 374 which rides in the narrow portion of a keyhole slot 376 formed in the central portion 28 of the base plate 10. A flange 378 extends downwardly therefrom through an opening 380 in the push-off slide 370, the flange 378 engaging the sides of the opening 380 so that the slide is guided by means of the flange 378 and slot 376 for reciprocal movement with respect to the base plate portion 28. A push-off slide actuating cam indicated generally at 382 is formed on the underside of the main gear 30 and extends downwardly therefrom. The slide 370 is provided with a downturned flange portion 384 and a spring 386 is connected between the flange 378 and the flange 384 so as ti bias the cam follower pin 372 into engagement with the outer surface of the cam 382. It will be noted that the spring 386 is connected to the flange 378 at a point closer to the base plate than the other end of the spring 386. Accordingly, the spring 386 also provides an upward bias on the slide 370.

In order to detent the main gear 30 in its home or detent position shown in FIG. 1 during periods between record changing cycles, a detent lever indicated generally at 390 (FIG. 25) is pivotally mounted on the base plate portion 28. More particularly, the lever 390 is provided with a pin 392 which extends into a keyhole slot 394 formed in base plate portion 28. A detent pin 396 is secured to an arm portion 398 of the lever 390 and extends upwardly through the opening 114 in the base plate portion 28. The detent pin 396 is biased into engagement with a main control cam indicated generally at 402 which is formed integrally with the main gear 30 and extends downwardly therefrom. The control cam 402 is provided with a notch portion 405 (FIG. 26) into which the detent pin 396 is biased by means of a spring 404 which is connected between a projection 406 formed in the arm 408 of the detent lever 390 and an opening 410 in the base plate portion 28. The spring 404 tends to rotate the lever 390 about the pivot pin 392 so that the detent pin 396 is held in the notch 405 when the gear 30 is in its home or detent position. The detent pin 396 is provided with a groove 397 (FIG. 7). One edge of the groove 397 moves along the arcuate edge portion 399 of the opening 114 in the base plate portion 28. With this arrangement the detent pin 396 is stabilized as the detent lever 390 is pivoted about the pin 392.

The push-off slide 370 is provided with a U-shaped end portion which defines a tab portion 412 (FIG. 5) which is positioned below the main portion of the push-off slide 370 and is immediately below an opening 414 in the slide 370 through which the lower end portion 416 of a record ejector blade indicated generally at 418 is positioned. The blade 418 is pivotally mounted in the body of the spindle 18 by means of a pin 420. The detent lever 390 is provided with an offset portion 422 (FIG. 25) at the end of the arm 408 which extends between the push-off slide 370 and its tab portion 412, as best illustrated in FIG. 5. The portion 422 of the detent lever 390 is provided with an arcuate narrow slot 424 (FIG. 25) which opens into a relatively wide slot 426, the intersection of the slots 424 and 426 defining an interference shoulder 428 in the vicinity of the end portion 416 of the ejector blade 418.

Since the spring 404 is connected to the base plate portion 28 it urges the portion 422 of the detent lever 390 upwardly into engagement with the push-off slide 370 and hence exerts an upward bias on the slide 370 in addition to the bias provided by the spring 386. With this arrangement the tab portion 412 of the push-off slide 370 exerts a slight upward force on the end of the record ejector blade portion 416. This force is employed during the last record sensing operation described in more detail hereinafter.

Considering first the operation of the push-off slide 370 in ejecting a record which is seated on the shelf 430 of the spindle 18, and assuming that a record changing cycle has been initiated in the manner described in detail heretofore, the push-off slide actuating cam 382 is provided with a first lobe portion 432 (FIG. 25) which functions to move the push-off slide 370 a slight amount during the initial or record sensing portion of the record changing cycle. During engagement of the pin 372 with the lobe 432 of the cam 382 the push-off slide 370 is moved from the position shown in FIG. 5 to the position shown in FIG. 33. During this movement the slight force which is exerted by the tab portion 412 on the end of the record ejector blade portion 416 is insufficient to move a record seated on the shelf 430 off of this shelf. As a result, the end portion 416 remains in the position shown in full lines in FIG. 33 as the slide 370 is moved to the right during engagement with the cam lobe portion 432. During this movement of the slide 370 the ejector blade end portion 416 is not moved since the opening 414 in the slide 370 provides clearance between the slide 370 and the end portion 416 during the record sensing portion of the record changing cycle. However, when the pin 372 engages the record ejecting lobe portion 434 on the cam 382, so that the push-off slide 370 is moved farther to the right as viewed in FIG. 5, the end portion 416 of the ejector blade 418 is engaged by the edge of the opening 414 in the slide 370 and is moved to the position shown in FIG. 34. During this push-off movement of the ejector blade 418, the upper portion 436 of the blade 418 engages the bottom record seated on the shelf 430 and moves this record off of the shelf so that the bottom record is deposited on the turntable 12. In this connection it will be understood that the position of the cam 382 on the gear 30 is so related to the position of the tone arm cam 108 that the tone arm 14 has been lifted upwardly and moved outwardly beyond the edge of the record stack before the end portion 436 of the record ejector blade has moved the bottom record off of the shelf 430. After the record has been ejected the spring 386 continues to bias the pin 372 into engagement with the cam 382 as the main gear 30 is rotated through the remainder of the record changing cycle. If desired, the ejector blade 418 may be provided with an elongated vertical slot for the pin 420 and is normally spring-biased so that the pin 420 is in the bottom of this slot. With such an arrangement the ejector blade may be depressed to the level of the shelf 430 by the record stack above the bottom record as the bottom record is ejected. The weight of the record stack is thus removed from the upper end of the blade 418 which facilitates return of the blade 418 to its rest position under the force of the return spring 386 through the slide 370. Such a spring-biased arrangement is shown and described in connection with the embodiment of FIGS. 38 and 39.

Figure 25:
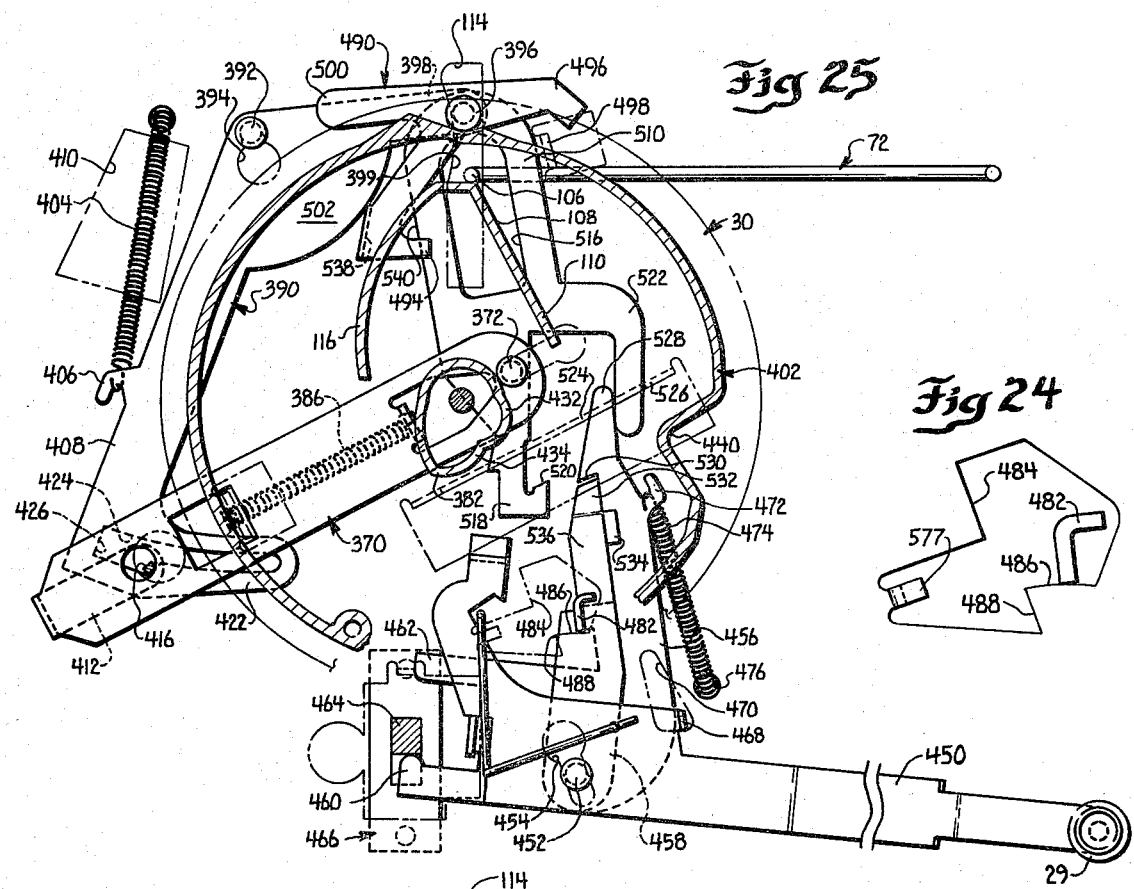
FIG. 25 is a fragmentary sectional view taken along the line 25—25 of FIG. 5 and showing the control knob of the changer of FIG. 1 in the OFF position.
Figure 24:
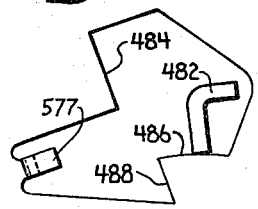
FIG. 24 is a fragmentary sectional view similar to FIG. 25 but taken on a somewhat larger scale.

Considering now the manner in which the absence of a record on the shelf 430 is sensed in accordance with the arrangement of the present invention, the control cam 402 on the main gear 30 is provided with a deep notch portion 440 (FIG. 25). During a normal record changing cycle, and assuming a record is seated on the shelf 430, when the gear 30 has been rotated an amount such that the detent pin 396 is opposite the notch 440 the spring 404 tends to rotate the detent lever 390 and move the detent pin 396 into the notch 440 but this action is prevented by engagement of the record ejector blade portion 416 with the interference shoulder 428 formed in the end portion 422 of the detent lever 390. In this connection it will be recalled that the light frictional force exerted on the end portion 416 by the tab 412 is insufficient to move the ejector blade 418 when a record is seated on the shelf 430. However, if no record is present on the shelf 430, during the initial record sensing portion of the cycle, i.e. during the period when the pin 372 engages the lobe 432 of the cam 382 and the slide 370 is moved from the position shown in FIG. 5 to the position shown in FIG. 33, the light force exerted on the end of the record ejector blade portion 416 is sufficient to move the ejector blade to the dotted line position 442 shown in FIG. 33. This movement of the bottom end of the ejector blade portion 416 causes a corresponding movement of the upper end 436 to the dotted line position 444 shown in FIG. 5. This last record sensing movement of the end portion 416 by engagement with the tab 412 takes place just prior to the point in the record changing cycle at which the detent pin 396 is opposite the notch 440. Accordingly, when the detent pin 396 encounters the notch 440 the ejector blade portion 416 is now moved into alignment with the notch 424 on the end portion 422 of the detent lever 390 so as to permit the spring 404 to rotate the detent lever 390 and move the detent pin 396 into the bottom of the notch 440. This inward movement of the detent pin 396 toward the center of the gear 30 is employed to turn off the motor 40 in accordance with a last record shut-off mechanism which will now be described.

Considering first the control linkage which is employed to turn on and off the motor manually, a control knob 29 is connected to the end of an on-off lever 450 (FIG. 25) which is rotatably mounted on a pin 452. The pin 452 is itself connected to a switch actuating plate 456 which is positioned below the lever 450. The pin 452 is provided with a groove which rides in the narrow portion of a keyhole slot 454 formed in the base plate portion 28. A flat spring blocking member 458 is positioned between the lever 450 and the plate 456 and is secured to the pin 452. More particularly, the pin 452 is provided with a first portion 453 of reduced diameter on which the on-off lever 450 is pivotally mounted. The pin 452 is also provided with a portion 455 of still smaller diameter which defines a shoulder 457 against which the blocking member 458 and switch actuating plate 456 are held by staking the end of the pin 452 so that the members 452, 456 and 458 move together. The plate 456 carries a pair of switch actuating arms 460 and 462 which are positioned on either side of the actuating button 464 of a slide switch indicated generally at 466. The on-off lever 450 is provided with an upwardly extending tongue portion 468 which extends into a triangularly shaped opening 470 in the base plate portion 28. The switch actuating plate 456 is provided with a projecting lug portion 472 to which one end of a spring 474 is connected, the other end of the spring 474 being connected to an opening 476 (FIG. 1) in the base plate portion 28. The on-off lever 450 is provided with a shoulder 478, FIG. 27 which is normally held in engagement with an upturned flange portion 480 on the switch actuating plate 456. In the OFF position of the control knob 29 the spring 474 functions to rotate the plate 456 so that the flange 480 thereof is in engagement with the shoulder 478 and the lever 450 is also rotated until the tongue 468 hits one end of the slot 470. In the OFF position of the plate 456 the arm 460 retains the switch button 464 of the switch 466 in the OFF position shown in FIG. 25.

The switch actuating plate 456 is provided with an upturned right angle flange portion 482 which extends upwardly through a notch 483 (FIG. 25C) in the blocking member 458 and an irregularly-shaped opening 484 in the base plate portion 28. In the OFF position of the lever 450 one edge of the flange 482 rides on the curved edge portion or shoulder 486 of the opening 484 and is positioned substantially away from a right angle edge portion 488 of the opening 484, the surfaces 486 and 488 forming an essentially right-angled shoulder or corner. When the lever 450 is moved upwardly (as viewed in FIG. 25) toward the ON position the lever 450 and plate 456 move as a unit so that the flange 482 rides along the surface 486. However, as soon as the edge of the flange 482 is moved beyond the edge of the curved surface 486 the spring 474 moves the plate 456 with a snap action to the ON position shown in FIG. 26 as the pin 452 moves to the bottom of the elongated slot 454. At the same time, the arm 462 of the plate 456 engages the button 464 and moves the switch 466 to the ON position with a quick snap action movement. During this movement of the plate 456 the flange 482 drops down beside the surface 488 of the base plate opening 484. As soon as the flange 482 moves beyond the edge of the curved surface 486 the linkage 450, 456 actually pivots about the end of the on-off lever 450 which is being held by the operator. However, the flange 482 is biased into engagement with the surface 488 by the spring 474 and holds the lever 450 in the detented ON position.

When the control knob 29 is moved from the ON to the OFF position manually the on-off lever 450 rotates about the tongue 468 as a fulcrum and lifts the pivot pin 452 within the notch 454. However, until the flange 482 has been moved inwardly by an amount sufficient to clear the inner edge of the surface 488 the spring 474 is unable to rotate the plate 456 and actuate the switch 464. Accordingly, it is not until the plate 456 has been moved inwardly by an amount sufficient to cause the flange 482 thereof to engage the curved surface 486 that the spring 474 then rotates the plate 456 about the pin 452 with a snap action and the arm 460 at this time moves the button 464 so that the switch 466 is turned to the OFF position. It will be noted that the above-described on-off control linkage is effective to provide a snap action actuation of the switch 466 so that a relatively simple and inexpensive slide switch 466 may be employed to turn on and off the motor 40. A more expensive switch would be required if the on-off control linkage were such that the switch 466 could be held momentarily in a mid position which could cause damage to the switch contacts. However, with the above-described control linkage of the present invention it is impossible for the operator by movement of the control knob 29 to position the switch 466 in a position intermediate the ON or the OFF positions due to the above described snap action of the flange 482 with respect to the shoulder 486, 488.

Considering now the automatic shut-off mechanism of the present invention which cooperates with the above-described on-off control linkage to turn off the machine when the detent pin 396 enters the notch 440 in the control cam 402, it is first noted that this shut-off action is accomplished during the same record changing cycle during which the absence of a record on the shelf 430 is detected by movement of the end portion 416 during the sensing portion of the record changing cycle. As described generally heretofore, the tone arm 14 is moved outwardly during the record changing cycle until it strikes the back wall 184 of the tone arm rest post 22, during the mid portion of the record changing cycle. In accordance with an important feature of the present invention the tone arm is lowered during the period when it is in engagement with the back wall 184 of the rest post 22 so that the tone arm is lowered into the notch 24 during the mid portion of the last record shut-off cycle. Furthermore, the tone arm remains in this somewhat lowered position during the remainder of a last record shut-off cycle so that the tone arm is not moved back inwardly as the gear 30 rotates back to its detent position, the clutch 122 slipping during this motion of the gear 30, as described in detail heretofore. Such an arrangement has the advantage that a set-down or rest post position for the tone arm is not required on the quadrant 124 or elsewhere with the attendant difficulties of aligning such a rest post position with the tone arm mechanism.

In order to lower the tone arm to an intermediate position within the rest post notch 24 after the tone arm has engaged the back wall 184, a tone arm latch member indicated generally at 490 (FIG. 25) is pivotally mounted on the detent pin 396. More particularly, the detent pin 396, which is staked to the detent lever 390 is provided with a shoulder portion 492 (FIG. 7) on which the tone arm latch 490 is pivotally mounted, the latch 490 being preferably made of thin spring stock, or the like. The tone arm latch 490 is provided with an inwardly extending hook portion 494 (FIG. 25) and an extension arm portion 496 which is adapted to engage a downturned flange portion 498 of the base plate portion 28 when the detent pin 396 enters the notch 440. The tone arm latch 490 is also provided with an arm portion 500 which rides on the surface 502 of the detent lever 390 to stabilize the tone arm latch 490 during pivotal movement thereof.

Figure 26:
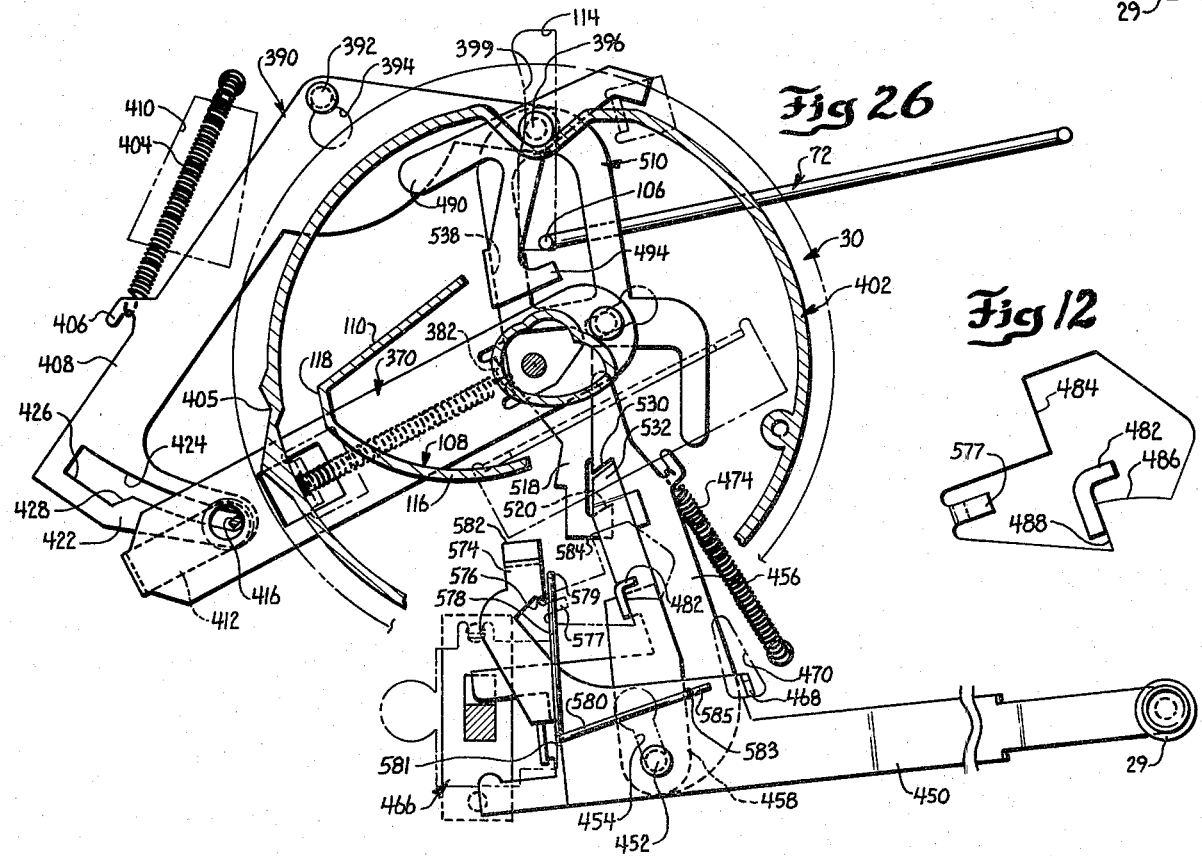
FIG. 26 is a view similar to FIG. 25 but showing the control knob in the ON position and the main cam in a last record shutoff cycle initiating position.
Figure 12:
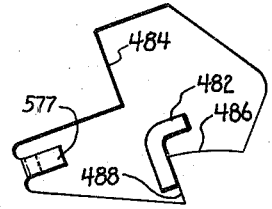
FIG. 12 is a fragmentary sectional view similar to FIG. 26 but taken on a somewhat larger scale.

As described generally heretofore, during the first portion of the record changing cycle the tone arm lift rod 72 is moved inwardly as the end 106 thereof follows the cam portion 110 on the gear 30. However, as the detent pin 396 enters the notch 440 the hook portion 494 of the tone arm latch 490 is moved inwardly to a point inside the end portion 106 of the lift rod 72 and as the arm 496 of the tone arm latch 490 engages the flange 498 the tone arm latch 490 is pivoted so that the hook portion 494 thereof is in alignment with the lift rod end portion 106 as shown in FIG. 26. Accordingly, as the detent pin 396 moves out of the notch 440 to the position shown in FIG. 27 the hook portion 494 engages the lift rod end portion 106 and moves it outwardly to the intermediate position shown in FIG. 27. At this point in the record changing cycle, the tone arm 14 has already been lifted from the record and moved outwardly into contact with the back wall 184 of the rest post 22. Accordingly, when the lift rod end portion 106 is moved outwardly by engagement with the hook portion 494 of the tone arm latch 490 the tone arm is immediately lowered into the notch 24 in the rest post 22. The detent pin 396 continues to ride on the periphery of the control cam 402 with the result that the latch 490 holds the lift rod 72 in the position shown in FIG. 27 until the end portion 106 of the rod 72 is engaged by the cam portion 116 near the end of the record changing cycle. When the end portion 106 engages the cam 116 the tone arm lift rod 72 is moved further down the inclined camming surface 98 and the end portion 74 thereof is lowered while the tone arm remains in the notch 24 of the rest post 22.

In order to actuate the on-off control linkage 450, 456 to turn off the motor 40 when the detent pin 396 enters the notch 440, a shut-off latch indicated generally at 510

(FIG. 25) is also pivotally mounted on the detent pin 396 and rotates on a shoulder formed by the reduced end portion 512 (FIG. 7) of the detent pin, the shut-off latch being retained on the end portion 512 by means of the C washer 514. The shut-off latch 510 is provided with a clearance opening 516 (FIG. 25) to accommodate movement of the lift rod end portion 106 and includes a first arm extension 518 which terminates in a hook portion 520, and an offset arm extension 522. Both of the arms 518 and 522 of the latch 510 are positioned in a slot 524 formed in a downturned flange portion 526 of the base plate portion 28. Also, the tip portion 528 of the switch actuating plate 456 also extends through the slot 524. The switch actuating plate 456 is also provided with a hook portion 530 immediately adjacent the inclined end portion 532 of the flat spring blocking member 458. The flat spring blocking member 458, which is positioned between the on-off lever 450 and the switch actuating plate 456 is provided with a notch to receive the right angle flange 482 of the switch actuating plate 456 so that the members 456 and 458 move together. However, the flat spring blocking member 458 is provided with an offset flange 534 which spaces the intermediate portion 536 of the flat spring member 458 below the plane of the members 456 and 518.

During a normal record changing cycle the shut-off latch 510 is never moved to a position in which the hook portion 520 thereof can become aligned with the hook portion 530 on the switch actuating plate 456. This is because the detent pin 396 never enters the notch 440 during a normal record changing cycle, as described in detail heretofore. However, when the detent pin 396 enters the notch 440 the shut-off latch 510 is moved so that the arm 518 thereof extends further through the slot 524. Also, when the detent pin 396 enters the notch 440 the tone arm latch 490 is pivoted by engagement of the arm 496 thereof with the flange 498, as described heretofore. When the tone arm latch 490 pivots, a downturned flange portion 538 (FIG. 25) thereof engages the edge 540 of the shut-off latch 510 and pivots it about the detent pin 396 to the position shown in FIG. 26.

In this position the hook portion 520 is positioned in alignment with the hook portion 530 on the switch actuating plate 456. Accordingly, as the detent pin 396 moves out of the notch 440, i.e. from the position shown in FIG. 26 to the position shown in FIG. 27 the hook portion 520 raises the inclined end portion 532 of the flat spring 458, moves into engagement with the hook portion 530 and after engagement of the members 520 and 530 lifts the on-off linkage 450, 456 slighlty so that the pivot pin 452 is moved upwardly in the keyhole slot 454 to the position shown in FIG. 27. By positioning all of the members 522, 528 and 518 in the common slot 524 the engagement and hooking of the members 520 and 530 is insured without misalignment during a shut-off cycle.

The members 520 and 530 remain in the above-described hooked position as the detent pin 396 rides around the periphery of the control cam 402. However, near the end of the record changing cycle the detent pin 396 encounters an outwardly projecting inclined portion 542 (FIG. 27) of the control cam 402 which functions to move the switch actuating plate 456 toward the center of the gear 30 by an amount sufficient that the flange 482 thereof is moved inwardly beyond the end of the surface 488 in the base plate portion 28. When this occurs, the spring 474 exerts a sidewise pressure on the interconnected members 510 and 456 which is sufficient to move the edge of the flange 482 to the right to the position shown in FIG. 28, so that the edge of the flange 482 is now above the forward edge of the curved surface 486 while the shut-off latch 510 remains in latched engagement with the switch actuating plate 456. However, the arm 522 of the latch 510 engages the end of the slot 524 in the flange 526 and blocks the arm 528 of the plate 456 so that the plate 456 is prevented from rotating to the OFF position and the motor 40 continues to be energized. It is necessary to continue energization of the motor 40 because the disclosed belt drive of the turntable 12 has relatively little coast after the motor is de-energized and the gear 30 might not be returned to the notch 405. If an idler wheel drive arrangement is employed for the turntable 12 considerable coast is provided so that the motor could be turned off earlier in the cycle.

As the gear 30 continues to rotate the detent pin 396 moves down the inclined portion 544 (FIG. 27) of the control cam 402. During this movement the edge of the flange 482 on the switch actuating plate 456 strikes the curved surface 486 which blocks further movement of the hook portion 530 while the hook portion 520 of the shut-off latch 510 continues to move away from the hook 530. As soon as the latch portions 520, 530 become disengaged, the spring 474 rotates the switch actuating plate 456 while the edge of the flange 482 rides on the curved surface 486 as a pivot. During this rotation of the switch actuating plate 456 the arm 460 thereof engages the switch button 464 and moves the slide switch 466 in a snap action to the OFF position, as illustrated in FIG. 29. When the switch 466 is opened the motor 40 is de-energized and the gear 30 is moved into the detent notch 405 on the control cam 402 by the force exerted thereon from the spring 404 through the detent lever 390 and the detent pin 396. As discussed generally heretofore, there is an extremely light load on the gear 30 at this point in the record changing cycle so as to insure that the detent pin 396 enters the home or detent notch 405 in the cam 402. As the switch actuating plate 456 is thus moved to the OFF position the flange portion 480 thereof engages the shoulder 478 (FIG. 27) on the on-off lever 450 and moves this lever to the OFF position in unison, as shown in FIG. 29.

MANUAL REJECT MECHANISM

Considering now the manner in which a record changing cycle may be manually initiated by moving the control knob 29 beyond the ON position to the REJECT position, reference may be had to FIG. 30 wherein the on-off lever 450 is shown in full lines in the REJECT position. In this position of the lever 450 the switch actuating plate 456, which rotates with the lever 450, is moved by an amount such that the flange 482 thereof is moved into engagement with a downturned flange 560 (FIG. 7A) on the velocity tripping member 62. The flange 560 extends through an opening 562 (FIG. 1) in the gear 30 and is provided with an offset end portion 564 which is adapted to be engaged by the flange 482 when this flange is moved to the REJECT position shown in FIG. 30. When the lever 450 is moved to the REJECT position the velocity tripping member 62 is moved by an amount sufficient to bring the shoulder 68 thereof into the path of the flange 70 on the turntable hub so that a record changing cycle is initiated in the manner described in detail heretofore. As soon as the control knob 29 is released, the spring 474 rotates the linkage 456, 450 back to the ON position shown in FIG. 31 wherein the side of the flange 482 engages the surface 488 of the opening 484 in the base plate portion 28. The lever 450 is thus restrained or detented in the ON position.

SINGLE RECORD PLAY ARRANGEMENT

In order to provide single record play facilities in a simple and economical manner so that a single record may be placed on the turntable 12 and played automatically after which the changer is shut off, movement of the control knob 29 to the REJECT position is employed to disable the automatic shut-off latch 510 during the record changing cycle which is initiated by movement of the knob 29 to the REJECT position. Such action is necessary because when a single record is played no record is positioned on the record shelf 430 and hence the automatic shut-off mechanism would function immediately to turn off the changer if the automatic shut-off latch 510 were not disabled. More particularly, when the control knob 29 is moved to the REJECT position the tip portion 528 of the switch actuating plate 456 engages the edge 568 (FIG. 30) of the arm portion 518 of the shut-off latch 510 and pivots the shut-off latch 510 about the detent pin 396 so that the shut-off latch 510 is moved to the end of the slot 524 in the flange 526, as shown in FIG. 30. In this position of the shut-off latch 510, a shoulder portion 570 thereof is positioned above the end of the slot 524. When the control knob 29 is released after being moved to the reject position the spring 474 returns the lever 450 back to the ON position but the shut-off latch 510 remains in the position shown in FIG. 30 with the shoulder 570 above the end of the slot 524. Accordingly, during the record changing cycle which is initiated after the single record has been placed on the turntable but before it has been played, when the gear 30 is rotated an amount sufficient to bring the detent pin 396 opposite the notch 440, as shown in FIG. 31 the detent lever 390 is pivoted only slightly until the shoulder 570 engages the end of the slot 524 in the flange 526 after which engagement the detent pin 396 is prevented from moving into the notch 440 in the control cam 402. Accordingly, the shut-off latch 510 is blocked by engagement of the shoulder 570 with the flange 526 so that the latch 510 is not pivoted and the hooked portion 520 thereof does not engage the hook portion 530 of the Switch actuating plate 456. The record changing cycle thus proceeds normally as the detent pin 396 moves into engagement with the control cam 402 at the far side of the notch 440. However, as the record is being moved off of the shelf 430 by the blade 418 (approximately mid cycle) the flange 384 on the pushoff slide 370 engages the edge portion 572 of the shut-off latch 510 and pivots the shutoff latch 510 about the detent pin 396 to the position shown in FIG. 32. The shut-off latch 510 is thus positioned so that the shoulder 570 thereof is positioned out of alignment with the end of the slot 524 in the flange 526.

However, this movement of the shut-off latch 510 occurs after the detent pin 396 is well past the notch 440, so that the manually initiated record changing cycle is completed in a normal manner. Accordingly, during the manually initiated cycle the latching members 520, 530 are prevented from becoming interconnected so that the control linkage remains in the ON position and the single record on the turntable is played during the following playing cycle. However, after this record is played a record changing cycle is automatically initiated and since there is no record present on the spindle shelf 430 an automatic shut-off cycle is performed in a manner identical to that described in detail heretofore so that the machine is turned off after the single record is played.

It will be noted that when the control knob 29 is in the OFF position the end portion 528 of the switch actuating plate 456 engages the extension arm 522 of the shut-off latch 510 and holds the shut-off latch in the position shown in FIG. 25. In this position the shoulder portion 570 of the shut-off latch 510 is positioned well away from the end of the slot 524 in the flange 526. This construction ensures that the shut-off latch 510 is not inadvertently moved so that the shoulder 570 becomes aligned with the end of the slot 524 as the record changer is carried about. When the on-off lever 450 is thereafter moved to the ON position there is no danger that the shoulder 570 will become latched against the edge of the slot 524 in the flange 526 and disable the last record shut-off mechanism so that the machine would not automatically shut off after the last record has been played.

It should also be noted that in the arrangement of the present invention a single record may be placed on the turntable the control knob 29 moved to the ON position (but not to the REJECT position) and the tone arm 14 manually placed on the record. Under these conditions, the machine will play the record placed on the turntable and then shut-off automatically. This is due to the fact that when the tone arm 14 is thus manually placed on the record to initiate a playing cycle there is no preceding record changing cycle during which it is necessary to block the shut-off latch 510. The record changing cycle which follows playing of the single record is an automatic shut-off cycle since no record is present on the shelf 430. On the other hand, when a single record play is initiated by moving the control knob 29 to the REJECT position, an automatic record changing cycle is initiated before the single record is played and it is then necessary to block the shut-off latch 510, by engagement of the shoulder 570 with the edge of the slot 524, to prevent the machine from being shut off before the record is played.

REPEAT PLAY ARRANGEMENT

In accordance with an important aspect of the present invention, the control knob 29 is provided with a REPEAT PLAY position which is intermediate the ON and OFF positions of the lever 450. When the control knob 29 is moved first to the ON position and then is moved approximately halfway back to the off position a detent force is exerted on the control knob 29 and an audible click is produced to inform the operator that the REPEAT PLAY position has been reached. When the control knob 29 is thus moved to the REPEAT PLAY position, either a single record placed on the turntable 12 may be replayed repeatedly, or if a stack of records is on the spindle 18 the stack of records will be played and then the last record will be played repeatedly. This repeated play of a record on the turntable will continue until control knob 29 is moved either to the ON position or the OFF position. To accomplish these objectives, the shut-off latch 510 is blocked when the control knob 29 is moved to the intermediate REPEAT PLAY position so that the changer will continue to play a record on the turntable 12 without turning the motor 40 off. More particularly, assuming that the control knob is in the ON position and that the tone arm 14 has been placed on the record, when the control knob 29 is moved toward the OFF position the on-off lever 450 is pivoted by engagement of the tab 468 thereof with the edge of the opening 470 in the base plate so that the switch actuating plate 456 is moved in a translatory manner as the flange 482 moves along the surface 488 and the pivot pin 452 moves up within the narrow portion of the keyhole slot 454.

The on-off lever 450 is provided with an extension arm 574 (FIG. 26) which includes a hook portion 576 which is adapted to engage the end of a repeat play control wire 578. The arm 574 is bent downwardly so that it is in horizontal alignment with the arm 518 of the shut-off latch 510. The wire 578 is positioned beneath the base plate portion 28 but above the plate 456 and rests on the upper surface of a downwardly offset tongue portion 577 of the base plate portion 28. The wire 578 is provided with a downturned right angle end portion 579 which is positioned in the path of the hook portion 576 as the lever 450 is rotated. An intermediate portion 580 of the wire 578 is positioned on top of the base plate portion 28 is secured within a notch 581 in the base plate portion 28 and a hole 583 therein, the end 585 of the portion 580 extending down through the hole 583, so that the wire 578 is prevented from moving lengthwise while at the same time permitting the wire 578 to be flexed sideways. The intermediate portion 580 of the wire 578 also serves the additional function of retaining the pivot pin 452 within the keyhole slot 454. Accordingly, as the on-off lever 450 is moved from the ON position toward the REPEAT PLAY position the outer edge of the hook 576 engages the side of the end portion 579 of the repeat wire 578 and flexes the wire 578 so that it moves sidewise away from the base of the tongue 577. However, when the lever 450 reaches the REPEAT PLAY position midway between the ON and OFF positions the wire end 579 snaps into the hook portion 576 and the wire 578 moves back against the base of the tongue 577 giving an audible click as this occurs. The end portion 579 of the repeat wire 578 is thus positioned within the hook portion 576 of the flange 574. When the lever 450 is released the spring 474 urges the hook portion 576 into engagement with the end portion 579 of the wire 578 so that the plate 456 is held in the position shown in FIG. 33A in which the flange 482 is still in engagement with the surface 488 so that a detent force is provided which holds the lever 450 in the REPEAT PLAY position. When the lever 450 is thus held by the wire 578 in the position shown in FIG. 33A, the end surface 582 (FIG. 26) of the arm 574 is positioned in abutting relationship to the end surface 584 on the extension arm 518 of the shut-off latch 510. Accordingly, during any succeeding record changing cycle, when the detent pin 396 attempts to move into the notch 440 in the control cam 402 the end surfaces 582, 584 meet and the shut-off latch 510 is blocked so that the detent pin 396 is prevented from entering the notch 440. When the shut-off latch 510 is blocked the hook portion 520 thereof is not moved into alignment with the hook portion 530 on the switch actuating plate 456. Accordingly, the on-off lever 450 is not actuated to the OFF position and the switch 466 remains on. This action occurs during each succeeding record changing cycle so that the record on the turntable is repeatedly played until the control knob 29 is moved either to the ON position or to the OFF position.

Considering the operation of the mechanism when the control knob 29 is moved from the REPEAT PLAY position to the OFF position, during such movement the on-off lever 450 is rotated about the tab 468 as a pivot and the flange 482 is moved upwardly by an amount sufficient to clear the upper edge of the surface 488 so that the above-described snap-action movement of the switch actuating plate 456 is provided by the spring 474 and the switch 466 is turned off. During this movement of the lever 450 the hook portion 576 thereof moves away from the end portion 579 of the control wire 578. On the other hand, if the control knob 29 is moved back to the ON position from the REPEAT PLAY position, the on-off lever 450 pivots about the tongue 468 and the hook portion 576 thereof cams past the end portion 579 of the control wire 578. As soon as the hook 576 moves past the end portion 579 the spring 474 urges the pin 452 to the bottom of the slot 454 so that the flange 482 of the plate 456 moves back down the surface 488 to the ON position shown in FIG. 26.

The last record shut-off facilities will then function normally when the knob 29 is moved back to the ON position so that the machine is shut off during the record changing cycle which ensues after the knob is moved back to the ON position, as described in detail heretofore.

TURNTABLE BRAKING ARRANGEMENT

It will be recalled from the preceding general description that facilities are provided in accordance with the present invention for stopping the turntable 12 during the record changing cycle so that this turntable is stationary as a new record is deposited thereon. Furthermore, this turntable braking action is accomplished without de-energizing the motor 40 and without raising or lowering the turntable 12. In order to accomplish these objectives, a turn table brake lever indicated generally at 620 (FIG. 1) is pivotally mounted on a post 622 mounted in the base plate central portion 28. The brake lever 620 is provided with an arm 624 which extends inwardly over a brake control cam track 626 on the upper surface of the main gear 30 and is provided with a pair of downwardly extending projections 628 and 630 which are positioned on opposite sides of the cam track 626. The other arm 632 of the lever 620 is flexible and carries a transverse end portion 634 at the outer end thereof to which is secured a turntable brake pad 636 which is adapted to engage the inside of the rim of the turntable 12. As the gear 30 rotates during the record changing cycle the brake lever 620 follows the contour of the cam track 626 due to the follower action of the pins 628, 630.

When the gear 30 is detented in the home position shown in FIG. 1, the lever 620 is positioned so that the pad 636 is not in engagement with the rim of the turntable 12. However, when a record changing cycle is initiated and the gear 30 starts to rotate, the pins 628, 630 cause the lever 620 to move in accordance with the contour of the cam track 626. When the portion 638 of the cam track is encountered the brake lever 620 is pivoted so that the arm 632 thereof is moved outwardly and the pad 636 is moved into engagement with the turntable rim as the arm 632 flexes slightly to produce a spring biasing force urging the pad 636 into engagement with the turntable rim with a predetermined force. After the record has been deposited on the turntable the portion 640 of the cam track 626 is encountered by the pin 628, 630 so that the brake lever 620 is pivoted about the post 622 and the pad 636 is removed from the turntable rim.

In accordance with an important feature of the present invention there is no spring biasing force continuously exerted on the brake lever 620. This is because a sufficient spring force is provided by flexure of the arm 632 when the pad 636 is urged into engagement with the turntable rim. When the lever is pivoted so that the pad 636 does not engage the turntable rim there is no bias exerted on the main gear 30 through the brake lever 620. Accordingly, as the main gear 30 approaches the detent notch 405 of the control cam 402 the brake lever 620 does not introduce any frictional force which would prevent this gear from moving to its detent position after the teeth of the gear 30 have become disengaged with the turntable hub teeth 58 as the notch 60 is encountered.

As described generally heretofore, when the turntable 12 is stopped by engagement of the brake pad 636 therewith, the turntable hub 38 continues to be rotated by the belt 50 while the low coefficient of friction washer 52 provides slippage between the upper surface of the turntable hub 38 and the undersurface of the turntable 12. The turntable 12 and mat 56 are also provided with a slight clearance between the turntable hub 38 and the central openings therein so as to permit the turntable to be stopped while the hub 38 continues to rotate.

In accordance with a further aspect of the invention, the tone arm subassembly 20 includes an audio clip indicated generally at 704 (FIGS. 4 and 22) on which the female type electrical receptacles 706 and 708 are positioned. The clip 704 comprises a flat panel of electrically insulating material which slides within a slot in a downwardly extending portion 710 of the tone arm subassembly base 76, the other end of the clip 704 being supported in a notch in the plate 82. With this arrangement the phonograph pickup supported on the forward end of the tone arm 14 may be electrically connected to the receptacles 696, 698 and the entire tone arm subassembly 20 may be manufactured as a unit and tested electrically before it is installed in the base plate 10. Installation of the completely assembled and tested subassembly 20 on the base plate 10 is conveniently accomplished by providing the openings 776, 778 and 780 (FIG. 23) in the base plate 10. The lift rod 72 is first inserted into the opening 776 and the housing 76 is provided with depending offset feet 782 and 784 which interlock with the corresponding edge portions 786 and 788 of the opening 776. The bottom edge of the housing 76 rests on the upper surface of the base plate 10 and the subassembly 20 is secured to the base plate by means of screws which are inserted through the openings 790 in the base plate 10 and into the housing 76. The drive-trip link 120 is then connected to the quadrant 124 by simply inserting the end portion 126 into the bushing 128, as shown in FIG. 11.

Referring now to FIGS. 35 and 36 of the drawings an alternative tone arm drive and velocity trip actuating arrangement is shown therein which may be used in place of the arrangement described in detail heretofore in connection with the embodiment of FIGS. 1 to 34, inclusive. In this alternative embodiment the drive-trip link 120a is connected to the tone arm quadrant 124 by means of the bushing 132 which is positioned within the elongated slot 130 in the tone arm quadrant 124, as described in detail heretofore. However, in the embodiment of FIGS. 35 and 36 an alternative clutch arrangement is employed to interconnect the link 120a with the main cycling gear 30a. More particularly, the end of the link 120a is formed in a modified hairpin shape to provide a relatively wide slot 720 and a somewhat narrower slot 722, the end portion 724 of the link 120a being secured to the main portion of the link by any suitable means, such as welding or brazing. A drive pin 726 may be rotatably mounted in the gear 30a and retained on the gear 30a by means of the retaining washer 728. The U-shaped end portion 730 of the link 120a rides on the upper surface of an annular wall portion 732 formed in the gear 30a and extending upwardly from the upper surface thereof.

The drive pin 726 is provided with an enlarged head portion 734 which is positioned over the end portion 730 of the drive link 120a to retain it in place while permitting longitudinal and rotary motion thereof with respect to the gear 30a. Sufficient vertical clearance is provided between the head portion 734 and the link 120a so that when the gear 30a is in the detent position shown in FIG. 35 the link 120a is not interconnected with the gear 30a and the end portion 730 may be moved forwardly toward the flange 66 as the tone arm moves inwardly over the record during the playing cycle. When the end portion 730 engages the flange 66, the link 120a is effective to move the velocity tripping pawl 62 to the record changing cycle initiating position, as described in detail heretofore in connection with the embodiment of FIGS. 1 to 34, inclusive. In the alternative, the pin 726 may be formed integrally with the gear 30a and suitable means provided for retaining the link 120a on the pin 726.

The diameter of the drive pin 726 is substantially less than the width of the slot 720 in the drive link 120a. Accordingly, during the first portion of the record changing cycle while the tone arm is being lifted off of the record, the link 120a is not interconnected with the gear 30a. However, when the pin 726 engages the narrower slot portion 722 of the link 120a the pin 726 becomes wedged into the slot 722 and interconnects the gear 30a with the tone arm quadrant 124 so that the tone arm is moved outwardly. When the tone arm strikes the blocking portion 184 of the rest post 22 the tone arm cannot move outwardly any further and the drive pin 726 slips within the slot 722 of the link 120a as the gear 30a continues to rotate. During the latter half of the record changing cycle the drive pin 726 is moved in the opposite direction and functions to move the tone arm quadrant 124 inwardly until the shoulder 192 thereof engages the size selector slide flange 194. When this occurs the pin 726 again slips within the slot 722 while the tone arm remains positioned for engagement with a twelve-inch record. This action continues until the pin 726 is moved into the larger slot 720 of the link 120a whereupon the link 120a becomes disconnected from the gear 30a as this gear moves to its home or detent position. It will be noted that in the embodiment of FIGS. 35 and 36, the clutching action which interconnects the gear 38 with the link 120a is accomplished without requiring vertical movement of the drive pin 726.

In FIGS. 37 and 38 alternative tone arm drive and velocity trip actuating arrangements are shown wherein the drive link 120b is provided with a single elongated narrow slot 740, the U-shaped end portion 742 of the link 120b being employed as a velocity tripping member which engages the flange 66 of the pawl 62 to initiate a record changing cycle when the gear is located in the detent position shown in FIG. 37. In the embodiment of FIG. 42 a drive pin 744 is provided with a head portion 746 which is positioned over the U-shaped end portion 742 of the link 120b to retain this link on the upper surface of the wall 732. However, the drive pin 744 is solidly secured to the cycling gear, by any suitable means, so that as this gear rotates the cross section presented to the slot 740 changes. As this cross-sectional dimension increases, the pin 744 becomes wedged into the slot 740 and a driving connection is established between the cycling gear and the link 120b so that the tone arm is moved outwardly. However, when the tone arm strikes the arm portion 184 of the rest post 22, the pin 744 slips within the slot 740 to provide the necessary slip clutch action as the cycling gear continues to rotate. When the cycling gear is in the detent position the pin 744 is completely disconnected from the link 120b so that this link may be used as a velocity trip actuating member, as described in detail heretofore in connection with the embodiment of FIGS. 1 to 34, inclusive. In the embodiment of FIG. 36 the pin 744 is provided with a D-shaped cross section. In the embodiment of FIG. 38 the pin 744 is provided with a diamond-shaped cross section. In both of these embodiments the changing cross-sectional dimension of the pin 744 relative to the width of the slot 740, as the main cycling gear rotates, produces the necessary wedging action to interconnect the cycling gear with the link 120b.

Referring now to FIGS. 39 to 41, inclusive, an alternative tone arm drive and velocity trip actuating arrangement is shown wherein a drive trip link 120c is employed to interconnect the main cycling gear 30c with the tone arm quadrant 124. In the embodiment of FIGS. 39 to 41, inclusive, the elongated slot 130 in the quadrant 124 is eliminated and the link 120c is pivotally connected directly to the quadrant 124 through the bushing 128 without permitting any lost motion between these members. A drive pin 750 is rotatably mounted in an opening 752 formed in the gear 30c and is provided with a transverse slot 754 within the end portion of the drive link 120c extends. The gear 30c is provided with an upstanding annular wall portion 756 adjacent the opening 752 and the link 120 rides on the upper surface of the wall 756. The pin 750 is provided with flexible leg portions 758 and 760 which terminate in feet 762 and 764 which are adapted to engage the underside of the gear 30c within a recess 766 formed therein.

When the main cycling gear 30c is positioned in its home or detent position shown in FIG. 39 the pin 750 is positioned so that the arcuate bottom surface 768 thereof is in engagement with an upturned flange portion 770 provided on the base plate portion 28, as shown in FIG. 40. In this position of the gear 30c the pin 750 is held in an upper position within the opening 752 so that the link 120c rides loosely within the opening 754 in the pin 750. Accordingly, during the playing cycle the link 120c is free to move within the slot 754 as the tone arm moves inwardly over the record. In this connection it will be noted that the opening 754 in the pin 750 is of sufficient width to permit the slight sideward movement of the link 120c as the tone arm is moved to the runout groove of the record.

In the embodiment shown in FIGS. 39 to 41, inclusive, the tone arm tripping arrangement does not include a velocity trip clutch connection between the link 120c and the quadrant 124. Accordingly, this embodiment is arranged to provide a change cycle initiating action which is responsive to the position of the tone arm rather than to the change in velocity when the tone arm engages the runout groove of a record. Thus, the link 120c is made of the correct length so that when the tone arm reaches the runout groove of a record on the turntable the end of the link 120c will engage the flange 66 and move the pawl 62 into the path of the flange 70 thereby initiating a record changing cycle. In the alternative, a photo-electric sensing and tripping arrangement may be employed which is responsive to movement of the link 120c to a predetermined point during the playing cycle, as will be readily understood by those skilled in the art. It will also be understood that a velocity trip clutch including the members 128, 130 and 134 may be employed in the embodiment of FIGS. 39 to 41 if desired so that a velocity tripping action is provided as described in detail heretofore in connection with the embodiment of FIGS. 1 to 34, inclusive.

Considering now the operation of the slip clutch connection between the gear 30c and the link 120c in the embodiment of FIGS. 39 to 41, inclusive, after the gear 30c has rotated an amount sufficient to permit lifting of the tone arm, the pin 750 is moved away from the flange 770 on the base plate portion 28 and assumes the position shown in FIG. 46. In this position the flexible leg portions 758, 760 urge the pin 750 downwardly within the opening 752 so that the link 120c is gripped between the upper wall of the slot 754 and the upper surface of the annular wall 756. Accordingly, as the gear 30c continues to move the tone arm 14 is moved outwardly until it engages the upstanding blocking portion 184 of the tone arm rest 22. When the tone arm is moved into engagement with the portion 184 the link 120c slips with respect to the flange 770, as described in detail heretofore in connection with the embodiment of FIGS. 1 to 34, inclusive.

If desired, the link 120c may be disconnected from the gear 30c during the mid portion of the record changing cycle so that the tone arm can remain in its outward position adjacent the rest post 22 as long as possible before it is moved inwardly to the edge of a twelve-inch record. More particularly, a second arcuate upstanding flange 772 may be formed in the base plate portion 28 in the path of the pin 750. When the gear 30c has rotated somewhat less than 180 degrees the surface 768 of the pin 750 is lifted to a position similar to FIG. 40 in which the link 120c is no longer clamped between the upper surface of the slot 754 and the upper surfaces of the annular wall 756. After the gear 30c has rotated by an amount sufficient to move the pin 750 away from the flange 772 the pin 750 again assumes a position similar to that shown in FIG. 41 and moves the tone arm inwardly until the shoulder 192 engages the flange 194 on the size selector slide 196. After the tone arm is thus restrained at the correct twelve-inch record position, the link 120c slips with respect to the pin 750 as the gear 30c continues to rotate. As the home or detent position of the gear 30c is reached, the pin 750 engages the surface 774 of the flange 770 so that the pin 750 is lifted to the position shown in FIG. 40 wherein the link 120c is disconnected from the gear 30c and may be used for a velocity trip actuating operation during the playing cycle.

In FIG. 42 an alternative embodiment of the invention is disclosed wherein separate tone arm drive means and velocity tripping means are employed. Referring to this figure, the slip clutch 122 on the main cycling gear 30d is employed to connect a drive link 120d to the tone arm quadrant 124d for moving the tone arm horizontally but a separate velocity tripping arrangement is employed to initiate a record changing cycle. In the embodiment of FIG. 42 the quadrant 124d is provided with a rectangular opening 820 within which is positioned the downturned right angle end portion of the drive link 120d. The link 120d is held at the correct level for engagment with the opening 820 by means of a member 822 which extends downwardly from the upper wall of the housing 76 and is provided with an opening 824 within which the intermediate portion of the link 120d is positioned.

In the embodiment of FIG. 42 the link 120d is only employed to move the tone arm and other velocity tripping means are employed to initiate a record changing cycle. For example, the velocity tripping arrangement shown in Dennis U.S. patent application Ser. No. 432,089 filed Jan. 9, 1974 may be employed. In such case a velocity tripping arm, similar to the arm 338 in said application, is mounted for rotation about the tone arm pivot and is frictionally connected to the tone arm, said arm being arranged to engage the flange portion 560 of the trip pawl 62 in the embodiment of FIGS. 1 to 34 of the present invention. In other respects the embodiment of FIG. 42 may be identical to the embodiment of FIGS. 1 to 34 described in detail heretofore.

In the embodiment of FIG. 42, when the gear 30 has moved to a position corresponding to FIG. 14, the clutch 122 connects the gear 30 to the link 120d. As the link 120d starts to move outwardly from the position shown in full lines in FIG. 42 there is no movement of the quadrant 124d until the end of the link 120d engages the back edge 826 of the opening 820 in the quadrant 124d. When this occurs, the link 120d moves the quadrant 124d, and the tone arm 14, outwardly to the position shown in dotted lines in FIG. 42 at which position the tone arm engages the blocking portion 184 of the rest post 22 and during further outward movement of the link 120d the clutch 122 slips, as described in detail heretofore. During the return motion of the link 120d the quadrant 124d is not moved until the end of the link 120d engages the forward edge 828 of the opening 820 whereupon the quadrant 124d is moved inwardly until the shoulder 192 engages the slide 196 at the twelve-inch record position and the clutch 122 slips as the gear 30 continues to move back to its detent position, as described in detail heretofore in connection with FIGS. 13 to 19, inclusive. During the playing cycle the quadrant 124d is moved inwardly as the tone arm moves inwardly over the record. During this movement the quadrant 124d is completely disconnected from the link 120d so that no loading from the link 120d is placed on the tone arm, the opening 820 in the quadrant 124d providing this lost motion connection between the quadrant 124d and the link 120d during the entire playing cycle.

In FIG. 43 of the drawings an alternative embodiment of the invention is disclosed wherein a two-plate velocity tripping mechanism is employed in place of the plate 62 and clutch member 132 in the embodiment of FIGS. 1 to 34, inclusive. Referring to FIG. 43, a drive-trip link 120f is connected to the main gear 30 through the clutch members 122 as the gear 30 rotates, as described in detail heretofore. However, in the embodiment of FIG. 43, the end of the link 120f is pivotally connected to the quadrant 124 but the slot 130 is eliminated so that there is no lost motion between the members 120f and 124. A two-plate velocity tripping mechanism is mounted on the gear 30, this mechanism comprising a bottom plate 852 and top plate 62a. The top plate 62a is provided with a pin 61a which extends through a hole in the bottom plate 852 and into an opening in the gear 30 so that the members 62a and 852 are each pivotally mounted for rotation about the axis of the pin 61a. The bottom plate 852 is provided with a pair of upstanding ears 850 and 856 which limit movement of the bottom plate 852 relative to the top plate 62a. The bottom plate 852 is provided with a flange 854 which is adapted to be engaged by the end of the link 120f. The plate 62a includes the downturned flange 560 which extends through the opening 562 in the gear 30 and has a shoulder 68a which is adapted to be engaged by the flange 70.

Near the end of the playing cycle the end of the link 120f engages the flange 854 and moves both members 62a and 852 toward the centering spindle. However, the flange 70 engages the plate 62a behind the shoulder 68a thereof and moves the top plate 62a back slightly while the plate 62a slips with respect to the bottom plate 852. When the run-out groove is encountered, the link 120f moves both members toward the spindle by an amount sufficient that the flange 70 engages the shoulder 68a on the top plate 62a and moves the gear 30 so that a record changing cycle is initiated. During the record changing cycle the members 62a and 852 are reset to their desired positions by engagement with the teeth of the gear 58 on the turntable hub. The bottom plate 852 is provided with a protruding portion 858 which is first engaged by the teeth of the gear 58 so that the ear 856 is reset to a position in engagement with one side of the member 62a. Thereafter, the members 62a and 852 are moved together to a position in which the shoulder 68a is positioned out of the path of the flange 70. It will be seen that the embodiment of FIG. 43 provides a lost motion connection between the link 120f and the plate 62a instead of the lost motion connection at the other end of the link 120 provided by the slot 130 in the embodiment of FIGS. 1 to 34, inclusive. In other respects the embodiments of FIG. 43 is identical to that of FIGS. 1 to 34, inclusive.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In an automatic record player, the combination of, a main cycling gear, means for rotating said gear one revolution during an automatic cycle, a tone arm mounted for rotation about a fixed point which is spaced from said gear, an elongated link member, means interconnecting one end of said link member with said tone arm at a point offset from said mixed point, said link member having an elongated slot therein, and a pin secured to said gear at a point offset from the center thereof and positioned in said slot, said pin having a cross section such that as said gear rotates said pin becomes wedged against the sides of said slot and connects said gear to said link member as said gear continues to rotate, whereby said tone arm is thereafter driven by said link and rotated about said fixed point.

2. The combination of claim 1, wherein said pin has a generally D-shaped cross section.

3. The combination of claim 1, wherein said pin is arranged to slide within said slot while wedged against the edges of said slot when said tone arm is prevented from moving, thereby to provide a slip-clutch connection between said link and said gear.

4. The arrangement of claim 1, wherein said link member is a wire formed to provide said elongated slot therein.

5. The arrangement of claim 2, wherein said gear is positioned at a rest position between record changing cycles, and said pin is positioned on said gear with the flat side thereof extending generally parallel to the longitudinal axis of said elongated slot when said gear is in said reset position.

6. The combination of claim 5, wherein said pin is adapted to slip relative to said link member as said gear means moves through said predetermined arc when said tone arm is prevented from moving.

7. In an automatic record player, the combination of, a main cycling gear, means for rotating said gear one revolution from an initial position during an automatic cycle, a tone arm mounted for rotation about a fixed point which is spaced from said gear, an elongated link member, means interconnecting one end of said link member with said tone arm at a point offset from said fixed point, means loosely supporting the other end of said link member for unrestrained movement relative to said gear when said gear is in said initial position, and clutch means operative as said gear is moved during the automatic cycle for interconnecting said gear with said other end of said link member, thereby to drive said tone arm from said gear through said link member, said clutch means permitting slippage between said link member and said gear when said tone arm is prevented from moving while said gear continues to rotate.

8. The combination of claim 7, which includes a rest post for said tone arm, means for moving said tone arm into engagement with said rest post during a last record shutoff cycle, and means for retaining said tone arm on said rest post while said clutch means permits said link member to slip relative to said gear as said gear continues to move during said last record shutoff cycle.

9. The combination of claim 8, wherein said rest post is provided with a notch in the upper end thereof, and said tone arm is positioned in said notch during said last record shutoff cycle, said notch being of sufficient depth to retain said tone arm while said link member slips relative to said gear.

10. In an automatic record player, the combination of, a main cycling gear, means for rotating said gear one revolution during an automatic cycle, a tone arm mounted for rotation about a fixed point which is spaced from said gear, an elongated link member, means interconnecting one end of said link member with said tone arm at a point offset from said fixed point, friction clutch means rotatable with said gear and operative as said gear is moved during the automatic cycle to connect said gear with the other end of said link member, thereby to drive said tone arm from said gear through said link member, a rest post for said tone arm, and means for blocking outward movement of said tone arm when said tone arm is positioned over said rest post, said friction clutch means permitting slippage of said link member to a new position relative to said gear when said tone arm engages said blocking means.

11. The combination of claim 10, wherein said blocking means is a part of said rest post.

12. In an automatic record player, the combination of, a main cycling member, means for rotating said cycling member one revolution during an automatic cycle, a pivotally mounted tone arm, an elongated link member, means interconnecting one end of said link member with said tone arm, means connecting the other end of said link member to said cycling member for moving said tone arm through said link member by engagement with said cycling member during the automatic cycle, said link member also being disengaged from said cycling member and moving with said tone arm during at least a portion of the playing cycle following said automatic cycle, and tripping means including means responsive to said motion of said link member during the playing cycle, for initiating another automatic cycle at the end of said playing cycle.

13. The combination of claim 12, wherein said tripping means includes pawl means carried by said gear, said pawl means being engaged by said link member as said tone arm moves inwardly over the record during said playing cycle.

14. The combination of claim 12, which includes a velocity tripping pawl carried by said gear and engaged by said link member as said tone arm moves inwardly during the playing cycle, and a lost motion connection between said pawl and said tone arm which permits said pawl to be reset relative to said tone arm as said tone arm engages the grooves of the record ahead of the run-out groove thereof.

15. The combination of claim 13, wherein said gear is detented in a rest position during the playing cycle, and guide means for said link member on said gear and effective when said gear is in said rest position to guide said link member into engagement with said pawl means as said tone arm moves inwardly during the playing cycle.

16. The combination of claim 14, wherein said lost motion connection is provided between said pawl and said link member.

17. The combination of claim 12, which includes a single velocity tripping pawl carried by said gear and engaged by said link member as said tone arm moves inwardly during the playing cycle, and slip clutch means interconnecting said link member with said tone arm with a light force which is sufficient to move said link member with said tone arm as said tone arm moves inwardly but is light enough to permit said link member to be reset relative to said tone arm as said tone arm engages the grooves of the record ahead of the run-out groove thereof.

18. The combination of claim 12, which includes a single velocity tripping pawl carried by said gear and engaged by said link member as said tone arm moves inwardly during the playing cycle, and said interconnecting means includes slip clutch means interconnecting said link member with said tone arm with a light force which is sufficient to move said link member with said tone arm as said tone arm moves inwardly during the playing cycle, and means for periodically engaging said pawl and moving said link member relative to said tone arm by overcoming the force of said slip clutch means.

19. The combination of claim 18, which includes a positioning plate connected to said tone arm, a slot in said plate, said link member having said one end portion movable within said slot, and means including spring means for interconnecting said one end portion with said plate to provide said light force.

20. The combination of claim 12, which includes a velocity tripping pawl carried by said gear, and a lost motion connection between said pawl and said link member which permits said pawl to be reset relative to said link member as said tone arm engages the grooves of the record ahead of the run-out groove thereof.

21. The combination of claim 12, which includes a velocity tripping pawl pivotally mounted on said gear, a trip member frictionally connected to said pawl and adapted to be engaged by said link member as said tone arm moves inwardly during the playing cycle, and means for periodically engaging said pawl and moving it relative to said trip member as said tone arm engages the grooves of the record ahead of the run-out groove thereof.

22. The combination of claim 21, which includes means for resetting both said pawl and said trip member as said gear rotates during an automatic cycle.

23. The combination of claim 21, which includes means for resetting said trip member relative to said link member during an automatic cycle.

24. In an automatic record changer, the combination of, a main cycling gear, means for rotating said gear one revolution during a record changing cycle, a tone arm mounted for rotation about a fixed point which is spaced from said gear, an elongated link member having one end thereof interconnected with said tone arm through a lost-motion connection, and means for urging said link into engagement with a point on said gear which is offset from the center thereof with a force which produces a frictional force which when exceeded permits sliding movement of said link member to a new position relative to said point on said gear when said tone arm is blocked from movement, said new position being maintained when said tone arm is no longer blocked, whereby upon rotation of said gear said tone arm is driven through said link and rotated about said fixed point, said lost-motion connection being operative substantially completely to disconnect said tone arm from said link member as said tone arm moves inwardly during the playing cycle.

25. In an automatic record player, the combination of, a main cycling gear, means for rotating said gear one revolution during an automatic cycle, a tone arm mounted for rotation about a fixed point which is spaced from said gear, an elongated link member, means interconnecting one end of said link member with said tone arm, a pin rotatably mounted on said gear at a point offset from the center thereof and having an opening through which said link member extends, and means operative during at least a portion of the automatic cycle for moving said pin relative to said gear so that said link member is urged into frictional engagement with said gear with a force sufficient to move said tone arm about said fixed point as said gear rotates during the automatic cycle.

26. The arrangement set forth in claim 25, wherein said pin moving means comprises cam means on said gear and adapted to move said pin so that said link member is held in frictional engagement with said gear as said gear rotates during the automatic cycle.

27. The arrangement set forth in claim 26, wherein said cam means comprises a pair of upstanding shoulders on said gear which are positioned on opposite sides of said pin and are adapted to engage said link member to provide said frictional engagement as said gear rotates during the automatic cycle.

28. The arrangement set forth in claim 27, wherein said pin is engaged by said link member and urged upwardly when said upstanding shoulders engage said link member, and means for restraining upward movement of said pin so that said link member is wedged between said pin and said shoulders to provide said frictional engagement.

29. The arrangement set forth in claim 28, which includes flexible means connected to said pin and adapted to engage said gear as said pin is urged upwardly, thereby to restrain upward movement of said pin and provide said frictional engagement.

30. The arrangement set forth in claim 29, wherein said flexible means comprises a pair of transversely extending flexible members on said pin and adapted to engage the under side of said gear as said pin is urged upwardly.

31. The arrangement set forth in claim 30, wherein said link member extends through an opening in said pin which has a vertical dimension substantially greater than the vertical cross sectional dimension of said link member, and means operative when said link member is not engaged by said shoulders for supporting said pin on said gear in a vertical position such that said link member may be moved readily through said opening without substantial frictional engagement with said gear.

32. The arrangement set forth in claim 31 which includes a pair of outwardly extending shoulders on said pin which support said pin in said vertical position by engagement with said gear.

33. The arrangement of claim 25, which includes a support member on which said gear is rotatably mounted, said pin is rotatably mounted in a vertically extending aperture in said gear, and said pin moving means comprises cam means positioned on said support member in the path of said pin and adapted to engage said pin as said gear rotates during the automatic cycle.

34. The arrangement of claim 33, wherein said pin is provided with a rounded bottom portion adapted to be engaged by said cam means as said gear rotates during the automatic cycle.

35. The arrangement of claim 25, wherein said frictional force is sufficiently small that said pin can rotate relative to said gear while maintaining said link member in frictional engagement with said gear.

36. The arrangement of claim 25, wherein said frictional force may be overcome and said link moved relative to said pin and said gear in the event said tone arm is restrained during the automatic cycle.

37. The arrangement of claim 25, wherein said elongated link member comprises a wire having sufficient stiffness to move said tone arm.

38. In an automatic record player, the combination of, a main cycling gear, means for rotating said gear one revolution during an automatic cycle, a tone arm assembly mounted for rotation about a fixed point which is spaced from said gear, an elongated link member, means for interconnecting one end of said link member to said tone arm assembly, means operative during an automatic cycle for frictionally connecting said link member to said gear so that as said gear rotates said tone arm is moved outwardly during the first half of the automatic cycle and is then moved inwardly during the second half of the automatic cycle, and means for interposing a blocking member in the path of said tone arm assembly during said inward movement to terminate inward movement of said tone arm at a desired location, said frictional connecting means permitting slippage between said link and said gear as said gear continues to rotate while said tone arm is restrained by said blocking means.

39. The combination of claim 38, wherein said link member has an elongated slot therein, and a pin mounted on said gear at a point offset from the center thereof and positioned in said slot, said pin being of circular cross section and at least a portion of said slot being relatively narrow so that said pin can be wedged against the sides of said slot when positioned within said narrow slot portion, thereby to interconnect said pin with said link member.

40. The combination of claim 39 wherein said pin is arranged to slip within said narrow slot portion when said tone arm is restrained.

41. The arrangement of claim 39, wherein said link member is a wire formed to provide said elongated slot therein.

42. The arrangement of claim 38, wherein said desired location is a tone arm set down position, and means for lowering said tone arm into engagement with a record at said desired set down position while said connecting means continues to hold said tone arm in engagement with said blocking means.

43. The arrangement of claim 42, which includes means for disconnecting said link from said gear after said tone arm is lowered into engagement with a record but before said gear reaches said rest position.

44. The arrangement of claim 38 which includes a rest post for said tone arm, and means for blocking outward movement of said tone arm when said tone arm is positioned over said rest post, said frictional connecting means permitting sliding movement of said other end of said link relative to said gear as said gear continues to rotate while said tone arm is restrained from further outward movement by said blocking means.

45. The arrangement of claim 44 wherein said blocking means is integral with said tone arm rest post.

46. The arrangement of claim 38, which includes a rest post for said tone arm, means for moving said tone arm into engagement with said rest post during the first half of a last record shutoff cycle, and means for restraining said tone arm against inward movement while said frictional connecting means permits said link member to slip relative to said gear as said gear continues to rotate during the second half of said last record shutoff cycle.

47. The arrangement of claim 46, wherein said tone arm is moved into engagement with said restraining means during the mid portion of said last record shutoff cycle.

48. The arrangement of claim 38, which includes tone arm retaining means positioned to engage the outer end of said tone arm and restrain said tone arm from inward movement, and means for moving said tone arm into engagement with said tone arm retaining means during the mid portion of a last record shutoff cycle, said frictional connecting means permitting slippage between said link and said gear during the latter portion of said last record shutoff cycle as said tone arm is held by said retaining means.

49. The arrangement of claim 48, which includes means for blocking outward movement of said tone arm during said first half of a record changing cycle, said blocking means positioning said outer end of said tone arm over said tone arm retaining means, and means for lowering said tone arm into engagement with said tone arm retaining means during said mid portion of a last record shutoff cycle.

50. In an automatic record player, a rotatable cycling member, means for rotating said member one revolution during an automatic cycle, a tone arm mounted for rotation about a fixed point which is spaced from said member, an elongated link member, means for connecting one end of said link member to said tone arm, and friction clutch means for urging said link into engagement with a point on said member which is offset from the center thereof to develop a frictional force which when exceeded permits sliding movement of said link member in either direction relative to said point on said member, whereby upon rotation of said member said tone arm is driven through said link and rotated about said fixed point while permitting slippage between said link and said member when said tone arm is restrained while moving in either direction.

51. The arrangement set forth in claim 50, wherein said friction clutch means exerts a force on said link in a direction generally perpendicular to the plane of said gear.

52. In an automatic record player, a rotatable cycling member, means for rotating said member one revolution during an automatic cycle, a tone arm mounted for rotation about a fixed point which is spaced from said member, an elongated link, means interconnecting one end of said link with said tone arm, and means for exerting a force on the other end of said link in a direction perpendicular to the longitudinal axis thereof to hold said other end in engagement with said member at a location which is offset from the center thereof, whereby said tone arm is driven through said link as said member rotates during an automatic cycle, said force exerting means being arranged to permit sliding movement of said link relative to said point on said member when said tone arm is prevented from moving.

53. The arrangement of claim 52, wherein said member is positioned at a rest position during a playing cycle, and said link is free to move relative to said member when said member is in said rest position.

54. In an automatic record player, a main cycling gear positioned in a rest position during a playing cycle, means for rotating said gear one revolution during an automatic cycle, a tone arm mounted for rotation about a fixed point which is spaced from said gear, an elongated link member, means interconnecting one end of said link member with said tone arm during a playing cycle, guide means for the other end of said link member and operative when said gear is in said rest position to cause said link member to move in a predetermined path as said tone arm moves during a playing cycle, tripping means including pawl means carried by said gear and engaged by said link member as said link member moves in said predetermined path for initiating an automatic cycle, and means for connecting said other end of said link member to said gear after said gear has moved away from said rest position during an automatic cycle, thereby to drive said tone arm through said link member during the automatic cycle.

55. In an automatic record player, a main cycling gear positioned in a rest position during a playing cycle, means for rotating said gear one revolution during an automatic cycle, a tone arm mounted for rotation about a fixed point which is spaced from said gear, an elongated link member, means for continuously connecting one end of said link member with said tone arm during a playing cycle, means on said gear for supporting the other end of said link member at a location offset from the center of said gear while permitting movement of said link member relative to said gear in a direction generally parallel to the longitudinal axis of said link member as said tone arm moves inwardly during a playing cycle, and tripping means including pawl means carried by said gear and engaged by said link member as said link member moves in said direction for initiating an automatic cycle said support means rotating with said gear during the automatic cycle thus initiated.

56. In an automatic record player, a rotatable cycling member positioned in a rest position during a playing cycle, means for rotating said cycling member one revolution during an automatic cycle, a tone arm mounted for rotation about a fixed point which is spaced from said cycling member, an elongated link member, means interconnecting one end of said link member with said tone arm during both record changing cycles and playing cycles, tripping means operative in response to movement of said link member as the tone arm moves during a playing cycle for initiating an automatic cycle, and means operative after said cycling member has moved away from said rest position during an automatic cycle for connecting the other end of said link member to said cycling member at a point offset from the center thereof, thereby to rotate said tone arm about said fixed point.

57. The arrangement of claim 56 wherein said connecting means also acts as a support means for said other end of said link member during playing cycles so that said link member moves in a direction generally along the longitudinal axis thereof in response to tone arm movement during a playing cycle.

58. The arrangement of claim 57, wherein said tripping means includes pawl means carried by said cycling member and positioned to be engaged by said link member as said link member moves in said direction during a playing cycle.

59. In an automatic record player, a rotatable cycling member positioned in a rest position during a playing cycle, means for rotating said cycling member one revolution during an automatic cycle, a tone arm mounted for rotation about a fixed point which is spaced from said cycling member, an elongated link member, means interconnecting one end of said link member with said tone arm, and means operative in response to movement of said link member during a playing cycle for initiating an automatic cycle and operative after said cycling member has moved away from said rest position during an automatic cycle for connecting the other end of said link member to said cycling member and rotating said tone arm about said fixed point as said cycling member continues to move during said automatic cycle.

60. The arrangement of claim 59, which includes means for guiding said link member in a predetermined path as said tone arm moves inwardly over the record during a playing cycle.

61. The arrangement of claim 60, wherein said change cycle initiating means includes pawl means engaged by said link member as said link member moves in said predetermined path during a playing cycle.

62. The arrangement of claim 61, wherein said pawl means comprises a single velocity tripping pawl carried by said cycling member, and said interconnecting means includes velocity trip clutch means operative to interconnect said one end of said link member with said tone arm so that said link member moves with said tone arm as said tone arm moves inwardly during a playing cycle while permitting said link member to be reset relative to said tone arm as said tone arm engages the grooves of the record immediately ahead of the run-out groove thereof.

63. The arrangement of claim 59, which includes a positioning plate connected to said tone arm and having an aperture therein, and said interconnecting means includes a member positioned within said aperture and engageable with either side thereof to rotate said tone arm in either direction about said fixed point.

64. The arrangement of claim 63, wherein said change cycle initiating means includes a single velocity tripping pawl carried by said cycling member and adapted to be engaged by said other end of said link member as said tone arm moves inwardly during a playing cycle, said aperture permitting said link member to be reset relative to said tone arm as said tone arm engages the grooves of a record immediately ahead of the run-out groove thereof.

65. The arrangement of claim 59 which includes slip clutch means interconnecting said one end of said link member and said tone arm during a playing cycle with a force which is sufficient to cause said link member to move with said tone arm during a playing cycle while permitting said link member to be reset relative to said tone arm by overcoming said force while said tone arm engages the grooves of a record immediately ahead of the run-on groove thereof.

66. The arrangement of claim 65, which includes a single velocity tripping pawl carried by said cycling member and adapted to be engaged by said other end of said link member as said tone arm moves inwardly during a playing cycle, and means for periodically engaging said pawl and resetting said link member relative to said tone arm by overcoming the force of said slip clutch means.

67. The arrangement of claim 59, wherein said interconnecting means provides a positive drive connection between said one end of said link member and said tone arm to rotate said tone arm during an automatic cycle and acts as a slip clutch during a playing cycle to permit said link member to be reset relative to said tone arm while said tone arm engages the grooves of a record immediately ahead of the run-out groove thereof.

68. The arrangement of claim 59, wherein said interconnecting means includes slip clutch means operative over a limited range to permit movement of said one end of said link member relative to said tone arm, said interconnecting means providing a positive drive connection between said link and said tone arm outside said limited range of said slip clutch means.

69. The arrangement of claim 66, wherein said link member moves in a direction generally parallel to the longitudinal axis thereof as said tone arm moves inwardly during a playing cycle, and said pawl includes a portion positioned to be engaged by said other end of said link member as it moves in said direction.

70. The arrangement of claim 65, which includes means for blocking inward movement of said tone arm during the last half of an automatic cycle in accordance with a desired set-down position of said tone arm, said connecting means acting to hold said slip clutch means at its maximum range as said cycling member continues to rotate after inward movement of said tone arm is blocked by said blocking means.

71. The arrangement of claim 70, wherein said connecting means continues to maintain said slip clutch means reset at maximum range until said cycling member approaches said rest position near the end of a record changing cycle.

72. The arrangement of claim 63, which includes means for blocking inward movement of said tone arm during the last half of an automatic cycle in accordance with a desired set down position of said tone arm, said connecting means being adapted to hold said member in engagement with one side of said aperture as said cycling member continues to rotate after said tone arm is blocked by said blocking means.

73. The arrangement of claim 72, wherein said connecting means urges said other end of said link member into engagement with said cycling member with a predetermined force which is overcome when said tone arm is restrained by said blocking means and permits sliding movement of said link member relative to said cycling member while holding said member in engagement with said one side of said aperture as said cycling member continues to rotate.

74. The arrangement of claim 72, which includes means for lowering said tone arm into engagement with a record at said desired set down position, said connecting means continuously holding said member in engagement with said one side of said aperture as said tone arm is lowered.

75. The arrangement of claim 74, wherein said connecting means is arranged to disconnect said link from said cycling member after said tone arm is lowered into engagement with a record but before said cycling member reaches said rest position.

76. The arrangement of claim 59, wherein said elongated member has extremely low mass to minimize the load on said tone arm as it moves over a record during a playing cycle, thereby permitting initiation of a record changing cycle when said tone arm engages a record with very light force.

77. The arrangement of claim 76, wherein said elongated member comprises a stiff wire.

78. The arrangement of claim 59, which includes pawl means carried by said cycling member and engaged by said link member as said tone arm moves inwardly over the record during a playing cycle.

79. In an automatic record player, a main cycling gear, means for rotating said gear one revolution during an automatic cycle, a pivotally mounted tone arm, an elongated link member, means interconnecting one end of said link member with said tone arm, means for supporting the other end of said link member on said gear at a location offset from the center thereof while permitting relative movement between said link and said gear, said offset location moving in a predetermined orbit as said gear rotates during an automatic cycle, and clutch means including a portion fixedly connected to and rotatable with said gear for selectively connecting and disconnecting a point on said link member to said gear at said offset location solely in response to the change in orientation of said fixed clutch portion relative to said link member as said gear rotates during the record changing cycle, whereby said tone arm is driven from said gear through said link member and said point on said link member is moved in said predetermined orbit during periods when said link member is connected to said gear by said clutch means.

80. The arrangement of claim 79, wherein said gear is positioned at a rest position between record changing cycles and said clutch means is operative to permit relative movement between said link and said gear over a predetermined range of movement of said gear on either side of said rest position.

81. The arrangement of claim 79, wherein said clutch means is effective to connect said link member to said gear while permitting relative rotation between said link and said gear about a predetermined axis offset from the center of said gear.

82. In an automatic record player, a main cycling gear, means for rotating said gear one revolution during an automatic cycle, a tone arm mounted for rotation about a fixed point which is spaced from said gear, an elongated link member, means interconnecting one end of said link member with said tone arm, a pin movably mounted on said gear at a point offset from the center thereof and moving in a predetermined orbit as said gear rotates, means fixedly connected to and rotatable with said gear for selectively moving said other end of said link member relative to said pin in accordance with the orientation of said moving means relative to said link member, and means responsive to said movement for urging a point on said link member into engagement with said pin with a force sufficient to move said tone arm about said fixed point as said gear rotates during the automatic cycle and said point on said link member is moved in said predetermined orbit.

83. The arrangement of claim 82, wherein said moving means includes cam means on said gear and adapted to engage said link member as said gear rotates during the record changing cycle.

84. The arrangement of claim 83, wherein said cam means comprises a pair of upstanding shoulders on said gear which are adapted to engage said link member as said gear rotates during the record changing cycle.

85. In an automatic record player, a main cycling gear, means for rotating said gear one revolution during an automatic cycle, a tone arm mounted for rotation about a fixed point which is spaced from said gear, an elongated link member, means connecting one end of said link member to said tone arm at a point offset from said fixed point, a pin mounted on said gear at a point offset from the center thereof and moving in a predetermined orbit as said gear rotates, the other end of said link member being movable with respect to said pin, means fixedly connected to and rotatable with said gear for selectively moving the other end of said link member in a direction generally parallel to the axis of said gear in accordance with the orientation of said moving means relative to said link member as said gear rotates during the record changing cycle, and means responsive to said movement of said link member for interconnecting a point on said other end of said link member and said pin so that said tone arm is moved about said fixed point as said gear rotates during the automatic cycle and said point on said link member is moved in said predetermined orbit.

86. In an automatic record player, the combination of, a main cycling gear, means for rotating said gear one revolution during an automatic cycle, a tone arm mounted for rotation about a fixed point which is spaced from said gear, an elongated link member, means connecting one end of said link member to said tone arm at a point offset from said fixed point, and clutch means including a portion fixedly connected to said gear at a point offset from the center thereof and movable in a predetermined orbit as said gear rotates during an automatic cycle, said clutch means being operative selectively to frictionally connect and disconnect a point near the other end of said link member to said gear in dependence upon the orientation of said clutch portion relative to said link member during the automatic cycle, whereby said tone arm is driven from said gear through said link member and said point on said link member is moved in said predetermined orbit only during a period when said link member is frictionally connected to said gear by said clutch means.

87. The combination of claim 14 wherein said lost motion connection is provided between said link member and said tone arm.

* * * * *